(12) United States Patent
Tsuji et al.

(10) Patent No.: US 8,620,563 B2
(45) Date of Patent: Dec. 31, 2013

(54) FUEL SUPPLY APPARATUS FOR INTERNAL COMBUSTION ENGINE

(75) Inventors: Kanta Tsuji, Wako (JP); Yosuke Shima, Wako (JP); Hideyuki Ichakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 13/095,640

(22) Filed: Apr. 27, 2011

(65) Prior Publication Data

US 2011/0295490 A1 Dec. 1, 2011

(30) Foreign Application Priority Data

Jun. 1, 2010 (JP) ................................ 2010-125748

(51) Int. Cl.
*F02B 3/10* (2006.01)
*F02D 41/34* (2006.01)

(52) U.S. Cl.
USPC ............ 701/104; 701/105; 123/299; 123/478

(58) Field of Classification Search
USPC .......................... 701/104, 105; 123/299, 478
See application file for complete search history.

(56) References Cited

U.S. PATENT DOCUMENTS

| | | | | |
|---|---|---|---|---|
| 5,402,760 A * | 4/1995 | Takeuchi et al. | ............... | 123/300 |
| 6,386,176 B1 * | 5/2002 | McGee | ......................... | 123/299 |
| 6,450,149 B1 * | 9/2002 | McGee | ......................... | 123/480 |
| 6,729,297 B2 * | 5/2004 | Futonagane et al. | .......... | 123/299 |
| 7,055,494 B2 * | 6/2006 | Nishimaki | ..................... | 123/299 |
| 7,234,439 B2 * | 6/2007 | Kikutani et al. | .............. | 123/299 |
| 7,395,807 B2 * | 7/2008 | Watanabe | ...................... | 123/305 |
| 8,155,859 B2 * | 4/2012 | Nakata et al. | ................. | 701/103 |
| 2002/0096140 A1 * | 7/2002 | Heinzelmann | ................ | 123/299 |
| 2005/0126535 A1 * | 6/2005 | Nishimaki | ..................... | 123/299 |
| 2005/0229898 A1 * | 10/2005 | Kikutani et al. | .............. | 123/299 |
| 2007/0215097 A1 * | 9/2007 | Watanabe | ...................... | 123/299 |
| 2010/0114459 A1 | 5/2010 | Engelmann et al. | | |
| 2011/0005491 A1 * | 1/2011 | Terada et al. | ................. | 123/299 |

FOREIGN PATENT DOCUMENTS

| | | |
|---|---|---|
| DE | 101 14 039 A1 | 9/2002 |
| DE | 10 2006 035 435 A1 | 5/2007 |
| EP | 1 835 161 A2 | 9/2007 |
| JP | 3-74548 A | 3/1991 |
| JP | 09-256897 A | 9/1997 |
| JP | 2009-092075 A | 4/2009 |

OTHER PUBLICATIONS

Japanese Office Action dated: Jul. 30, 2013, Application No. 2010-125748.

* cited by examiner

*Primary Examiner* — Erick Solis
(74) *Attorney, Agent, or Firm* — Arent Fox LLP

(57) ABSTRACT

A fuel supply apparatus for an internal combustion engine having a plurality of cylinders, which supplies fuel through fuel injection valves provided corresponding to the plurality of cylinders. An amount of fuel supplied to the engine is controlled by changing a fuel injection period of said fuel injection valve, and performing a fuel injection with a plurality of injection modes including a reference injection mode. A fuel injection amount parameter for controlling a valve opening period of the fuel injection valve in the reference injection mode, is calculated according to an operating condition of said engine. When the injection mode is determined to be another injection mode which differs from the reference injection mode, the fuel injection amount parameter is corrected so as to compensate shortage or oversupply of the fuel injection amount according to a correction parameter indicative of a time period which affects a pressure change of the fuel supplied to the fuel injection valve caused by employing the other injection mode.

16 Claims, 12 Drawing Sheets

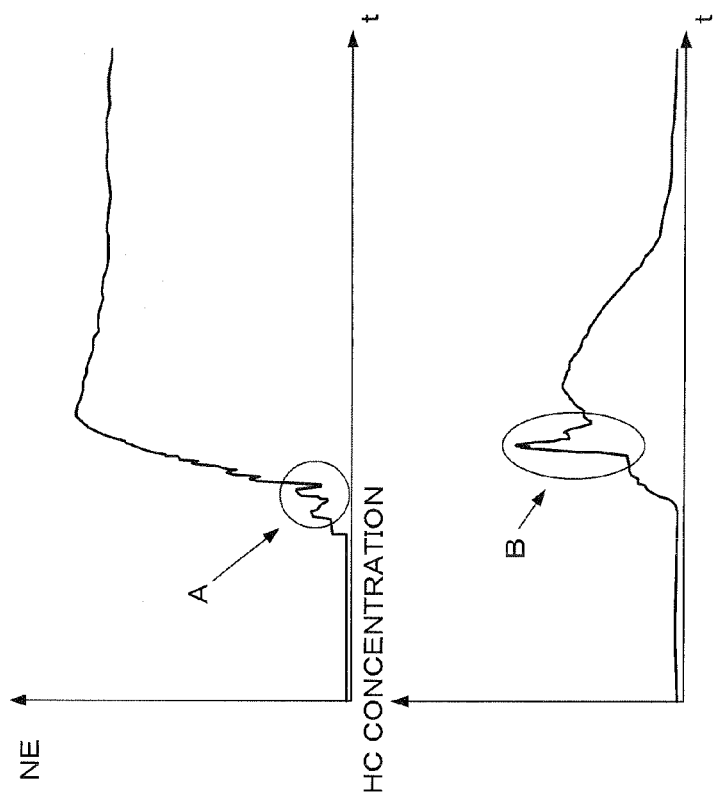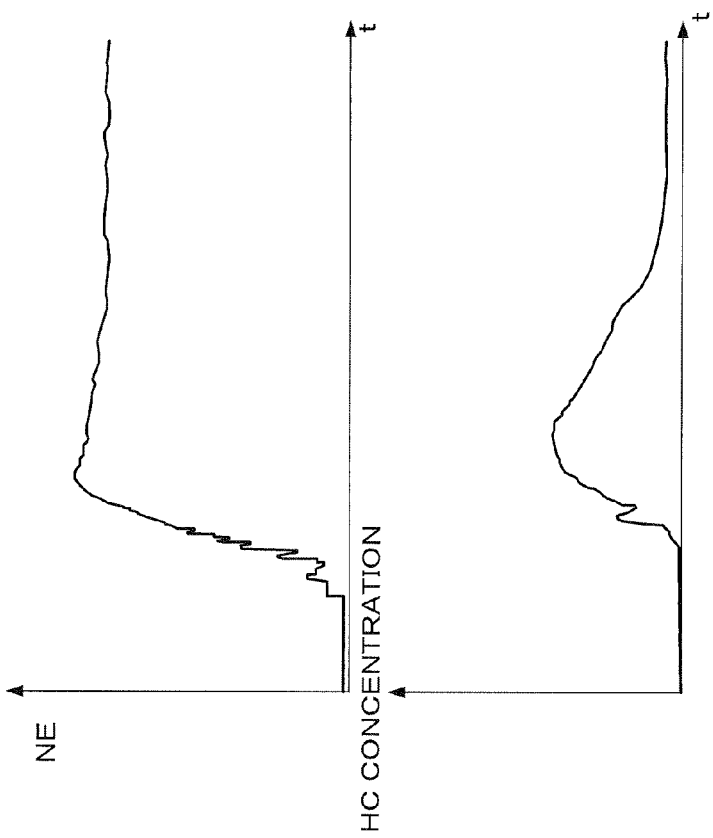

FUEL SUPPLY APPARATUS FOR INTERNAL COMBUSTION ENGINE

BACKGROUND OF THE INVENTION

1. Field of the Invention

The present invention relates to a fuel supply apparatus for an internal combustion engine having a plurality of cylinders, which supplies fuel through fuel injection valves, and particularly to a fuel supply apparatus which performs the fuel injection in which fuel injection periods corresponding to a plurality of cylinders overlap with each other in a specific operating condition of the engine.

2. Description of the Related Art

Japanese Patent Laid-open No. H03-74548 (JP'548) discloses a fuel supply apparatus which performs correction according to a pressure of fuel supplied to a fuel injection valve (fuel pressure) in order to estimate an amount of fuel injected by the fuel injection valve with sufficient accuracy. In the fuel supply apparatus for the internal combustion engine shown in JP'548, two fuel injection modes are adopted, i.e., one is a sequential injection mode and the other is a group injection mode in which the fuel injections are simultaneously performed with respect to two cylinders. The fuel injection amount is estimated taking the following two points into consideration: one point is that the flow rate of fuel consumed in one combustion changes depending on the fuel injection mode, and the other point is that the fuel flow rate changes depending on a pressure difference between the fuel pressure and the intake pressure.

JP'548 suggests the above-described method for estimating the fuel injection amount with sufficient accuracy. However, no technique for controlling the fuel injection amount to a desired value with sufficient accuracy is shown in JP'548. Further, changes in the fuel pressure during the period in which the fuel injection valve opens are not taken into consideration. Therefore, it is difficult to accurately control the fuel injection amount especially in the group injection mode, only by using the technique shown in JP'548.

SUMMARY OF THE INVENTION

The present invention was made contemplating the above-described point, and an objective of the invention is to provide a fuel supply apparatus for an internal combustion engine, which performs fuel injections in an ordinary sequential injection mode and another fuel injection mode in which injection periods of a plurality of fuel injection valves overlap with each other, and controls a fuel injection amount with sufficient accuracy in each fuel injection mode, thereby maintaining good exhaust characteristic and good operating performance of the engine.

To attain the above objective, the present invention provides a fuel supply apparatus for an internal combustion engine having a plurality of cylinders, which supplies fuel through fuel injection valves (6) provided corresponding to the plurality of cylinders. The fuel supply apparatus has fuel injection control means for controlling an amount of fuel supplied to the engine by changing a fuel injection period (TOUTF) of the fuel injection valve, and performing a fuel injection with a plurality of injection modes including a reference injection mode. The fuel injection control means includes fuel injection amount parameter setting means, injection mode determining means, and correcting means. The fuel injection amount parameter setting means sets a fuel injection amount parameter (TOUTS, TOUTD) for controlling a valve opening period of the fuel injection valve in the reference injection mode, according to an operating condition of the engine. The injection mode determining means determines whether or not an injection mode of the fuel injection to be performed is the reference injection mode. The correcting means corrects the fuel injection amount parameter (TOUTS, TOUTD) so as to compensate shortage or oversupply of the fuel injection amount according to a correction parameter (TOUTS, TOUTD, TOVRLP) when the injection mode is determined to be another injection mode which differs from the reference injection mode. The correction parameter is a parameter indicative of a time period which affects a pressure change of the fuel supplied to the fuel injection valve caused by employing the other injection mode.

With this configuration, the fuel injection amount parameter for controlling the valve opening period of the fuel injection valve in the reference injection mode is set according to the engine operating condition. When the injection mode of the injection to be performed is determined to be another injection mode which differs from the reference injection mode, the fuel injection amount parameter is corrected so as to compensate shortage or oversupply of the fuel injection amount according to the correction parameter indicative of the time period which affects a pressure change of the fuel supplied to the fuel injection valve caused by employing the other injection mode. Therefore, the fuel injection suitable to the other injection mode which differs from the reference injection mode, is performed to prevent a change in the engine output torque and a change in the air-fuel ratio due to the difference of the injection mode, thereby maintaining good engine operating performance and exhaust characteristic.

Preferably, the reference injection mode is a single injection mode in which the fuel injection periods of the fuel injection valves corresponding to the plurality of cylinders do not overlap with each other, and the other injection mode is an overlapped injection mode in which the fuel injection periods corresponding to a part or all of the plurality of cylinders overlap with each other. The correction parameter is an overlap period (TOUTS, TOVRLP) of the fuel injection periods corresponding to the plurality of cylinders.

With this configuration, the reference injection mode is the single injection mode in which the fuel injection periods corresponding to the plurality of cylinders do not overlap, and the other injection mode is the overlapped injection mode in which the fuel injection periods corresponding to a part or all of the plurality of cylinders overlap with each other. The correction parameter is the overlap period of the fuel injection periods corresponding to the plurality of cylinders. When performing the overlapped injection, the fuel injection amount parameter is corrected according to the overlap period. The overlapped injection is performed, for example, in the following specific engine operating conditions, and the fuel supply amount to each cylinder can appropriately be controlled when performing the overlapped injection in such specific operating conditions:

1) when the fuel injections are simultaneously performed with respect to two or more cylinders (all cylinders at the maximum) upon starting the engine, 2) when the fuel injection to the next cylinder is started before completion of the fuel injection to the present fuel injection in the operating condition where the engine rotational speed rapidly increases so that the time period of one stroke becomes shorter due to the initial combustion upon starting the engine, or due to a rapid acceleration.

3) when an additional fuel injection is performed with respect to the cylinder in the intake stroke while performing the normal fuel injection in the exhaust stroke in the operating condition where a rapid increase in the output torque is required, such as the operating condition where the engine speed is rapidly accelerated or the fuel cut operation ends to restart the fuel injection, and 4) when the fuel injection to the next cylinder is started before completion of the present fuel injection in the operating condition where the fuel injection period is set to a comparatively great value, such as when performing the cold start of the engine.

Preferably, the correcting means calculates a correction coefficient (KPFGR, KPFOVR) according to the overlap period (TOUTS), and corrects the fuel injection amount parameter (TOUTS) using the correction coefficient. In this aspect, the correction coefficient (KPFGR, KPFOVR) is set so that the correction coefficient increases as the overlap period (TOUTS, TOVRLP) increases in a range where the overlap period is equal to or less than a first threshold value (TOUTP), and the correction coefficient decreases as the overlap period increases in a range where the overlap period is greater than the first threshold value (TOUTP).

With this configuration, the correction coefficient is calculated according to the overlap period, and the fuel injection amount parameter is corrected using the calculated correction coefficient. Accordingly, a plurality of fuel injection parameter amount calculation processes corresponding to the plurality of injection modes are not required, but only one calculation process is sufficient, thereby reducing the calculation load on the control system. Further, the correction coefficient is set so that it increases as the overlap period increases in the range where the overlap period is equal to or less than the first threshold value, and decreases as the overlap period increases in the range where the overlap period is greater than the first threshold value. According to this setting, the correction can appropriately be performed corresponding to the pressure change of the fuel supplied to the fuel injection valve during the fuel injection period.

Alternatively, the correcting means calculates a correction amount (TOUTGRADD) according to the overlap period (TOUTS), and performs the correction by adding the correction amount (TOUTGRADD) to the fuel injection amount parameter (TOUTS). In this aspect, the correction amount (TOUTGRADD) is set so that the correction coefficient increases as the overlap period in a range where the overlap period is equal to or less than a second threshold value (TOUTBS), and the correction coefficient is constant in a range where the overlap period is greater than the second threshold value (TOUTBS).

With this configuration, the correction amount is calculated according to the overlap period and the correction is performed by adding the correction amount to the fuel injection amount parameter. Accordingly, a plurality of fuel injection amount parameter calculation processes corresponding to the plurality of injection modes are not required, but only one calculation process is sufficient, thereby reducing the calculation load on the control system. Further, the correction amount is set so that it increases as the overlap period increases in the range where the overlap period is equal to or less than the second threshold value, and takes a constant value in the range where the overlap period is greater than the second threshold value. According to this setting, the correction can appropriately be performed corresponding to the pressure change of the fuel supplied to the fuel injection valve during the fuel injection period.

Alternatively, the reference injection mode is a predetermined period overlapped injection mode in which fuel injection periods of the fuel injection valves corresponding to a part or all of the plurality of cylinders overlap with each other for a predetermined period, and the other injection mode is a fuel injection mode in which an overlap period of the fuel injection periods corresponding to the plurality of cylinders is equal to "0" or a period other than the predetermined period. In this aspect, the correction parameter is a difference period between the predetermined period in the reference injection mode and the overlap period in the other injection mode.

With this configuration, the reference injection mode is the predetermined period overlapped injection mode in which the fuel injection periods of the fuel injection valves corresponding to a part or all of the plurality of cylinders overlap with each other for the predetermined period, and the other injection mode is the fuel injection mode in which an overlap period of the fuel injection periods corresponding to the plurality of cylinders is equal to "0" or a period other than the predetermined period. The difference period between the predetermined period and the overlap period in the other injection mode is used as the correction parameter. In this case, the fuel injection amount parameter is required to be corrected by an amount according to the difference period of the overlap period. Accordingly, the correction can appropriately be performed by using the difference period as the correction parameter.

Alternatively, the reference injection mode is an overlapped injection mode in which fuel injection periods of the fuel injection valves corresponding to a part or all of the plurality of cylinders overlap with each other, and the other injection mode is a single injection mode in which the fuel injection periods corresponding to the plurality of cylinders do not overlap. In this aspect, the correction parameter is an overlap period (TOUTD) of the fuel injection periods corresponding to the plurality of cylinders.

With this configuration, the reference injection mode is the overlapped injection mode in which the fuel injection periods corresponding to a part or all of the plurality of cylinders overlap with each other, and the other injection mode is the single injection mode in which the fuel injection periods of the plurality of cylinders do not overlap. The overlap period of the fuel injection periods corresponding to the plurality of cylinders is used as the correction parameter. The relationship between the reference injection mode and the other injection mode is contrary to the relationship of the above-described configuration. In this case, the correction of the fuel injection amount parameter is required when performing the single injection. Accordingly, the correction can appropriately be performed in the single injection mode by using the overlap period as the correction parameter.

Preferably, the correcting means calculates a correction coefficient (KPFGRD) according to the overlap period (TOUTD), and corrects the fuel injection amount parameter using the correction coefficient. In this aspect, the correction coefficient (KPFGRD) is set so that the correction coefficient decreases as the overlap period increases in a range where the overlap period (TOUTD) is equal to or less than a first threshold value (TOUTP), and the correction coefficient increases as the overlap period increases in a range where the overlap period is greater than the first threshold value (TOUTP).

With this configuration, the correction coefficient is calculated according to the overlap period, and the fuel injection amount parameter is corrected using the correction coefficient. The correction coefficient is set so that it decreases as the overlap period increases in the range where the overlap period is equal to or less the first threshold value, and increases as the overlap period increases in the range where the overlap period is greater than the first threshold value. According to this setting, the correction can appropriately be performed when the overlapped injection mode is the reference injection mode.

Alternatively, the correcting means calculates a correction amount (TOUTGRADD) according to the overlap period (TOUTD), and performs the correction by adding the correction amount (TOUTGRADD) to the fuel injection amount parameter (TOUTD). In this aspect, the correction amount (TOUTGRADD) is set so that the correction amount decreases as the overlap period increases in a range where the overlap period is equal to or less than a second threshold value (TOUTBD), and the correction amount is constant in a range where the overlap period is greater than the second threshold value (TOUTBD).

With this configuration, the correction amount is calculated according to the overlap period, and the correction is performed by adding the correction amount to the fuel injection amount parameter. The correction amount is set so that it decreases as the overlap period increases in the range where the overlap period is equal to or less than the second threshold value, and takes a constant value in the range where the overlap period is greater than the second threshold value. According to this setting, the correction can appropriately be performed when the overlapped injection mode is the reference injection mode.

The present invention further provides a fuel supply apparatus for an internal combustion engine having a plurality of cylinders, which supplies fuel through fuel injection valves (6) provided corresponding to the plurality of cylinders. The fuel supply apparatus has fuel injection control means and fuel pressure parameter calculating means. The fuel injection control means controls an amount of fuel supplied to the engine by changing a fuel injection period (TOUTF) of the fuel injection valve, and performs a fuel injection with a plurality of injection modes including a reference injection mode. The fuel pressure parameter calculating means calculates a fuel pressure parameter (PFINJ2) indicative of a pressure of the fuel supplied to the fuel injection valve. The fuel injection control means includes fuel injection amount parameter setting means, injection mode determining means, and correcting means. The fuel injection amount parameter setting means sets a fuel injection amount parameter (TOUTS) for controlling a valve opening period of the fuel injection valve in the reference injection mode according to an operating condition of the engine. The injection mode determining means determines whether or not an injection mode of the fuel injection to be performed is the reference injection mode. The correcting means corrects the fuel injection amount parameter (TOUTS) according to a ratio of the fuel pressure parameter value (PFINJ2) corresponding to another injection mode which differs from the reference injection mode, and the fuel pressure parameter value (PFINJBS) corresponding to the reference injection mode, when the injection mode is determined to be the other injection mode.

With this configuration, the fuel pressure parameter indicative of the pressure of the fuel supplied to the fuel injection valve is calculated, and the fuel injection amount parameter for controlling the valve opening period of the fuel injection valve in the reference injection mode is set according to the engine operating condition. When the injection mode of the fuel injection to be performed is determined to be different from the reference injection mode, the fuel injection amount parameter is corrected according to the ratio of the fuel pressure parameter value corresponding to the other injection mode and the fuel pressure parameter value corresponding to the reference injection mode. The fuel injection amount correlates with the fuel pressure. Therefore, by correcting the fuel injection amount parameter according to the ratio of the fuel pressure parameter indicative of the fuel pressure, the fuel injection suitable to the other injection mode which differs from the reference injection mode can be performed to prevent changes in the engine output torque and changes in the air-fuel ratio due to the difference of the injection mode, thereby maintaining good operating performance and exhaust characteristics of the engine.

Preferably, the reference injection mode is a single injection mode in which fuel injection periods of the fuel injection valves corresponding to the plurality of cylinders do not overlap, and the other injection mode is an overlapped injection mode in which the fuel injection periods corresponding to a part or all of the plurality of cylinders overlap with each other. In this aspect, the correcting means performs the correction by performing an additional fuel injection in the other injection mode.

With this configuration, the reference injection mode is the single injection mode in which the fuel injection periods of the plurality of cylinder do not overlap, and the other injection mode is the overlapped injection mode in which the fuel injection periods corresponding to a part or all of the plurality of cylinders overlap with each other. When the overlapped injection is performed, shortage of the fuel is corrected by the additional fuel injection. Therefore, the same effect is obtained as the correction by increasing the fuel injection period of one time fuel injection.

Preferably, the fuel pressure parameter is an average value of the fuel pressure during the valve opening period of the fuel injection valve.

With this configuration, the average value of the fuel pressure in the valve opening period of the fuel injection valve is used as the fuel pressure parameter value, thereby improving accuracy of the correction by a comparatively simple method.

The present invention further provides a fuel supply apparatus for an internal combustion engine having a plurality of cylinders, which supplies fuel through fuel injection valves (6) provided corresponding to the plurality of cylinders. The fuel supply apparatus has fuel injection control means for controlling an amount of fuel supplied to the engine by changing a fuel injection period (TOUTF) of the fuel injection valve, and performing a fuel injection with a plurality of injection modes including a reference injection mode. In this apparatus, the reference injection mode is a single injection mode in which fuel injection periods of the fuel injection valves corresponding to the plurality of cylinders do not overlap, and another injection mode is an overlapped injection mode in which the fuel injection periods corresponding to a part or all of the plurality of cylinders overlap with each other. The fuel injection control means includes fuel injection amount parameter setting means, average fuel pressure calculating means, additional correction amount calculating means, and additional correction amount calculating means. The fuel injection amount parameter setting means sets a fuel injection amount parameter (TOUTS) for controlling a valve opening period of the fuel injection valve in the reference injection mode according to an operating condition of the engine. The average fuel pressure calculating means calculates an average fuel pressure (PFINJ) which is an average value of a pressure of fuel supplied to the fuel injection valve during a main fuel injection. The average fuel pressure calculating means performs the calculation immediately after completion of the main fuel injection performed according to the fuel injection amount parameter (TOUTS). The additional correction amount calculating means calculates an additional correction amount (TOUTADINJ) according to a ratio of the average fuel pressure (PFINJ) calculated by the average fuel pressure calculating means and a reference average fuel pressure (PFINJBS) corresponding to the reference injection mode. An additional fuel injection for injecting fuel of the additional correction amount (TOUTADINJ) is performed immediately after execution of the main fuel injection.

With this configuration, the fuel injection is performed with the single injection mode which is the reference injection mode and the overlapped injection mode in which the plurality of fuel injection periods overlap with each other, and the fuel injection amount parameter for controlling the valve opening period of the fuel injection valve in the reference injection mode is set according to the engine operating condition. The average fuel pressure, which is an average value of the pressure of the fuel supplied to the fuel injection valve during the fuel injection, is calculated immediately after completion of the main fuel injection according to the fuel injection amount parameter. The additional correction amount is calculated according to the ratio of the average fuel pressure and the reference average fuel pressure corresponding to the reference injection mode. The additional fuel injection corresponding to the additional correction amount is performed immediately after execution of the main fuel injection. The ratio of the average fuel pressure changes when the plurality of fuel injections overlap with each other. Accordingly, the required amount of fuel can be supplied by the additional fuel injection. Consequently, the correction can appropriately be performed without predicting the overlap of fuel injections.

BRIEF DESCRIPTION OF THE DRAWINGS

FIGS. 6A and 6B are time charts for illustrating an improvement obtained by the correction of the fuel injection period;

DETAILED DESCRIPTION OF THE PREFERRED EMBODIMENTS

Preferred embodiments of the present invention will now be described with reference to the drawings.

First Embodiment

Figure 1:
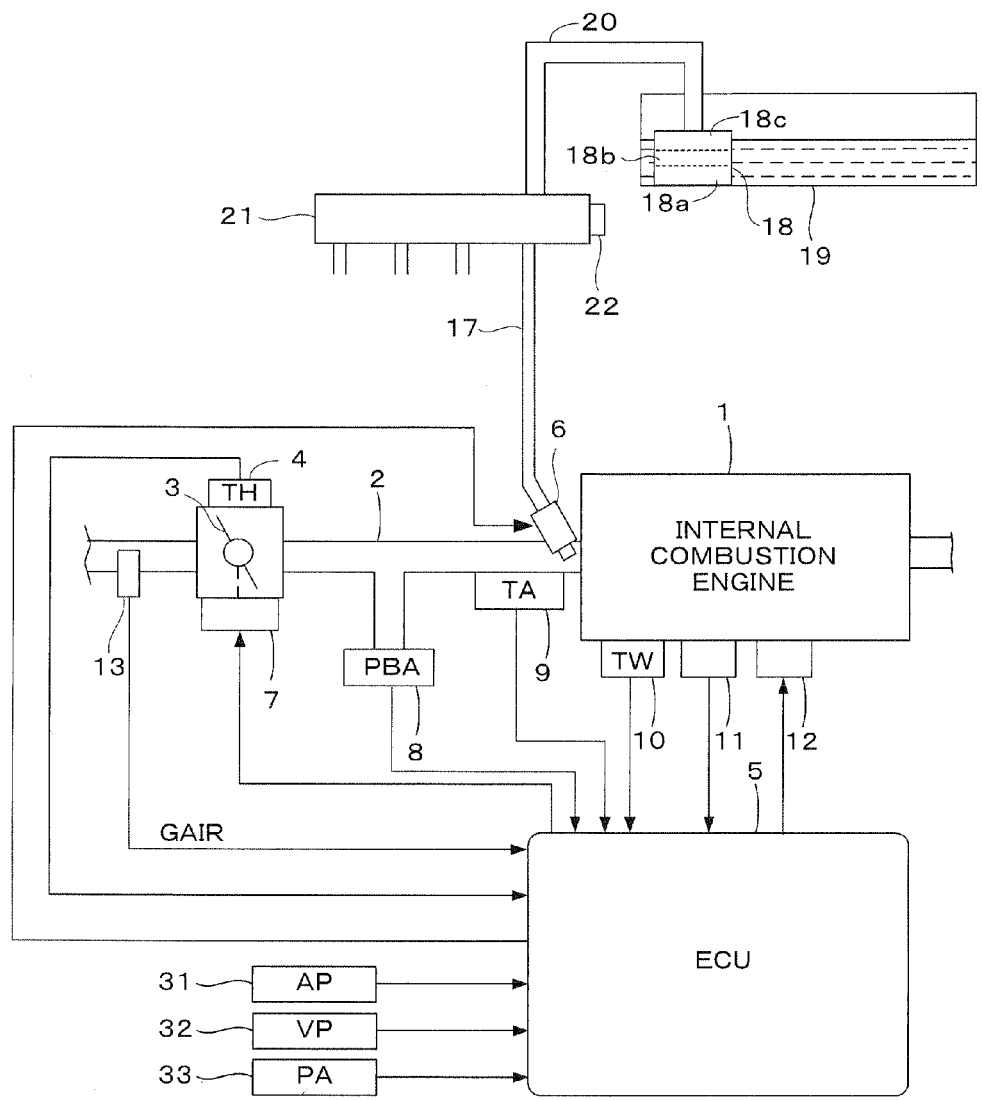
FIG. 1 is a schematic diagram showing a configuration of an internal combustion engine, a fuel supply apparatus, and a control system therefor according to one embodiment of the present invention.

FIG. 1 is a schematic diagram showing a configuration of an internal combustion engine and a control system therefor according to one embodiment of the present invention. The internal combustion engine (hereinafter referred to as "engine") 1, for example, having four cylinders has an intake pipe 2 provided with a throttle valve 3. A throttle valve opening sensor 4 for detecting a throttle valve opening TH is connected to the throttle valve 3, and a detection signal of the throttle valve opening sensor 4 is supplied to an electronic control unit (hereinafter referred to as "ECU") 5. An actuator 7 for actuating the throttle valve 3 is connected to the throttle valve 3, and the operation of the actuator 7 is controlled by the ECU 5. An intake air flow rate sensor 13 for detecting an intake air flow rate GAIR is provided upstream of the throttle valve 3 in the intake pipe 2, and a detection signal of the intake air flow sensor 13 is supplied to the ECU 5.

A fuel injection valve 6 for injecting fuel in the intake pipe 2 corresponding to each cylinder of the engine 1 is provided slightly upstream of respective intake valves (not shown). The fuel injection valve 6 is connected to a delivery pipe 21 through a fuel supply pipe 17. The delivery pipe 21 having a pulsation damper 22 is connected to a fuel pump unit 18 in a fuel tank 19 through a fuel pipe 20. The fuel pump unit 18 is configured in one body to contain a fuel pump 18a, a fuel strainer 18b, and a pressure regulator 18c whose reference pressure is a pressure in the fuel tank.

The fuel injection valve 6 is electrically connected to the ECU 5, and a valve opening timing (fuel injection timing) and a valve opening period (fuel injection period) are controlled by the drive signal from the ECU 5. A spark plug 12 of each cylinder of the engine 1 is connected to the ECU 5. The ECU 5 supplies an ignition signal to each spark plug 12 and controls the ignition timing.

An intake pressure sensor 8 for detecting an intake pressure PBA and an intake air temperature sensor 9 for detecting an intake air temperature TA are disposed downstream of the throttle valve 3. Further, an engine coolant temperature sensor 10 for detecting an engine coolant temperature TW is mounted on the body of the engine 1. The detection signals from these sensors are supplied to the ECU 5.

A crank angle position sensor 11 for detecting a rotational angle of a crankshaft (not shown) of the engine 1 is connected to the ECU 5, and a signal corresponding to a detected rotational angle of the crankshaft is supplied to the ECU 5. The crank angle position sensor 11 includes a cylinder discrimination sensor which outputs a pulse (hereinafter referred to as "CYL pulse") at a predetermined crank angle position of a specific cylinder of the engine 1. The crank angle position sensor also includes a TDC sensor which outputs a TDC pulse at a crank angle position of a predetermined crank angle before a top dead center (TDC) starting an intake stroke in each cylinder (i.e., at every 180 degree crank angle in the case of a four-cylinder engine) and a CRK sensor for generating one pulse (hereinafter referred to as "CRK pulse") with a constant crank angle period (e.g., a period of 6 degrees, shorter than the period of generation of the TDC pulse). The CYL pulse, the TDC pulse, and the CRK pulse are supplied to the ECU 5. The CYL pulse, the TDC pulse, and the CRK pulse are used to control various timings, such as the fuel injection timing and the ignition timing, and to detect an engine rotational speed NE.

An accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (this depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, and the spark plugs 12.

The CPU in the ECU 5 controls the fuel injection (the fuel injection timing and the fuel injection period performed by each fuel injection valve 6) according to the detected signals from the above-described sensors.

Figure 2A:
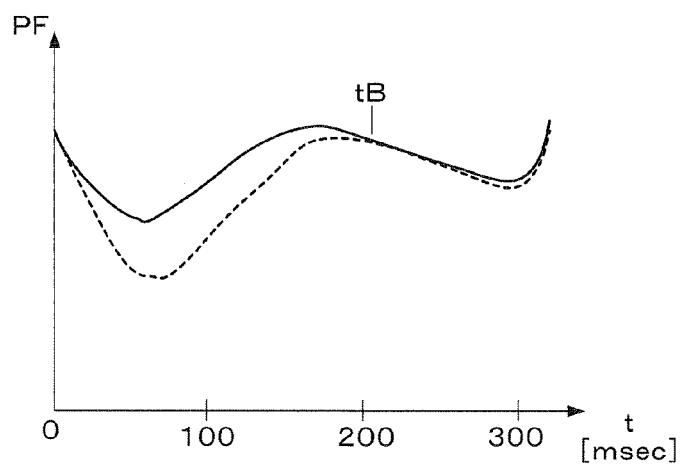
FIGS. 2A and 2B are time charts for illustrating a problem that arises when the fuel injections corresponding to two cylinders are simultaneously performed.

FIG. 2A is a time chart illustrating changes in a fuel pressure PF when performing the fuel injection whose fuel injection period is 300 milliseconds. The solid line corresponds to a single injection performed by only one fuel injection valve, and the broken line corresponds to an overlapped injection in which two fuel injection valves are opened at the same time. As shown in FIG. 2A, during the period from the start time (0) of the fuel injection to time tB (hereinafter referred to as "boundary time"), the fuel pressure of the overlapped injection is less than the fuel pressure of the single injection. After the boundary time tB, both fuel pressures are substantially equal to each other.

Figure 2B:
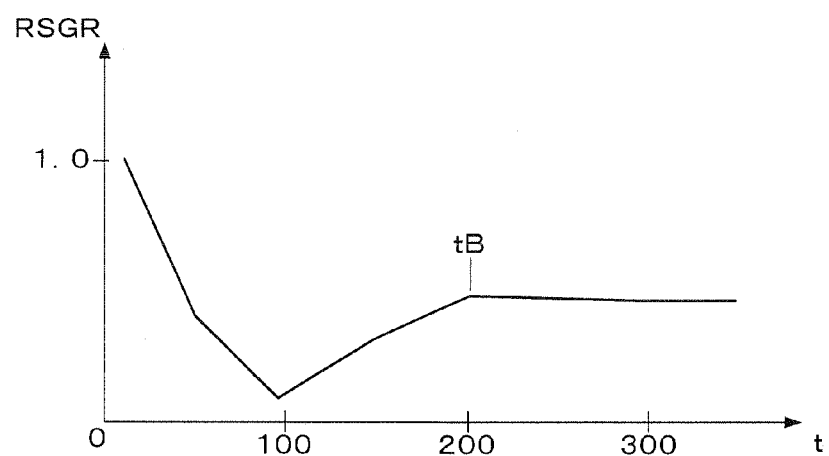

FIG. 2B illustrates changes in an instantaneous value ratio RSGR of the fuel injection amount in the example shown in FIG. 2A. The instantaneous value ratio RSGR is a ratio of an instantaneous fuel amount of the overlapped injection GGR to an instantaneous fuel amount of single injection GSG (RSGR=GGR/GSG). The instantaneous value ratio RSGR of the fuel injection amount decreases with time elapsing to reach the minimum value, increases from the minimum value, and is substantially constant after the boundary time tB. That is, the overlapped injection fuel amount GGR is less than the single injection fuel amount GSG. Therefore, for example, if a fuel injection period TOUTS for supplying the single injection fuel amount GSG (hereinafter referred to as "single mode injection period TOUTS") is assumed to be a reference value, it is necessary to calculated a fuel injection period TOUTD of the overlapped injection by correcting the single mode injection period TOUTS in the increasing direction according to the instantaneous value ratio RSGR of the fuel injection amount.

Figure 3:
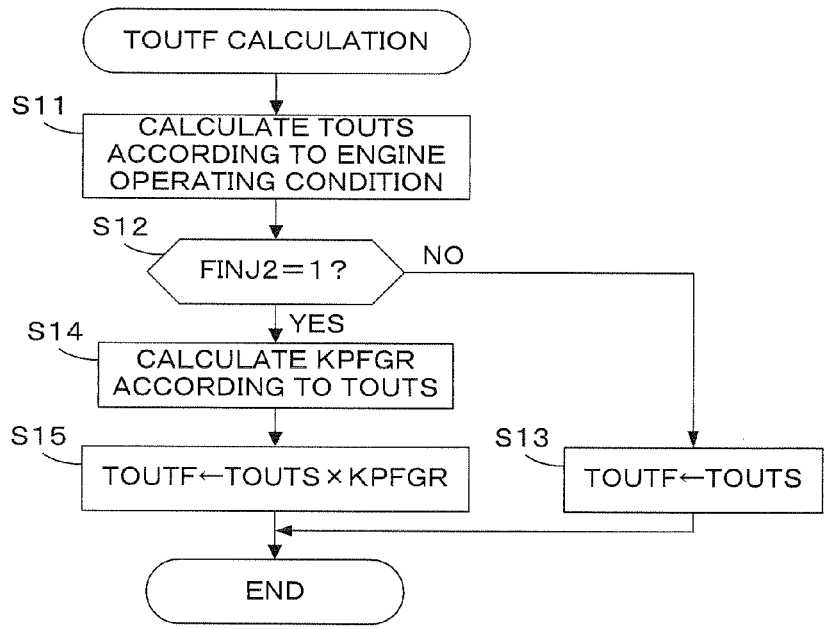
FIG. 3 is a flowchart of a process for calculating a fuel injection period (TOUTF)

FIG. 3 is a flowchart of a process for calculating a fuel injection period TOUF. This process is executed by the CPU in the ECU 5 in synchronism with generation of the TDC pulse.

In step S11, the single mode injection period TOUTS is calculated with a known method according to the engine operating condition. In step S12, it is determined whether or not a 2-cylinder simultaneous injection flag FINJ2 is "1". The 2-cylinder simultaneous injection flag FINJ2 is set to "1" when performing an overlapped injection in which the fuel injection valves corresponding to two cylinders are simultaneously opened during the same period (hereinafter referred to as "2-cylinder simultaneous injection mode").

Figure 5A:
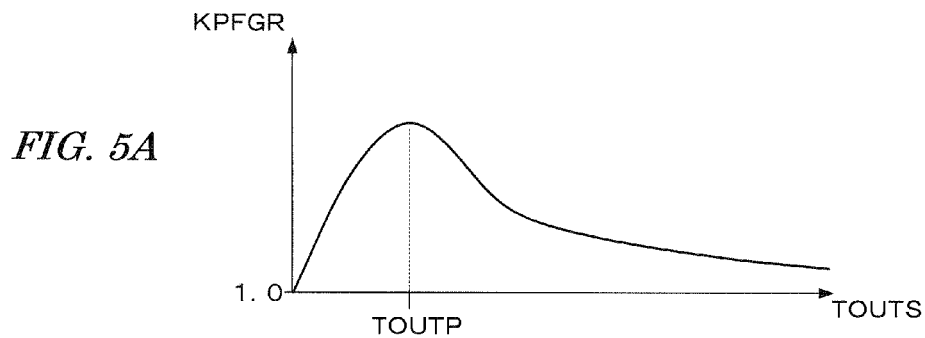
FIGS. 5A-5D show the tables used for calculating a fuel injection period.

If the answer to step S12 is negative (NO), i.e., if the fuel injection mode is a single injection mode, the fuel injection period TOUTF is set to the single mode injection period TOUTS (step S13). If the answer to step S12 is affirmative (YES), i.e., if the fuel injection mode is the 2-cylinder simultaneous injection mode, a KPFGR table shown in FIG. 5A is retrieved according to the single mode injection period TOUTS, to calculate a correction coefficient KPFGR (step S14). In a range where the single mode injection period TOUTS is less than the peak injection period TOUTP shown in FIG. 5A, the KPFGR table is set so that the correction coefficient KPFGR increases as the single mode injection period TOUTS increases. In a range where the single mode injection period TOUTS is greater than the peak injection period TOUTP, the KPFGR table is set so that the correction coefficient KPFGR decrease as the single mode injection period TOUTS increases.

In step S15, the fuel injection period TOUTF is calculated by the following equation (1).

$$TOUTF = TOUTS \times KPFGR \quad (1)$$

The fuel injection valve 6 is actuated to open according to the calculated fuel injection period TOUTF, to control the fuel injection amount.

According to the process of FIG. 3, the single mode injection period TOUTS is increased by the correction coefficient KPFGR in the 2-cylinder simultaneous injection mode. Therefore, the fuel amount which is equal to the fuel amount in the single injection mode is supplied to each cylinder also in the 2-cylinder simultaneous injection mode, to prevent changes in the engine output torque or the air-fuel ratio.

FIGS. 6A and 6B are time charts for illustrating an improvement obtained by the correction. FIGS. 6A and 6B illustrate changes in the engine rotational speed NE and an HC (hydrocarbon component) concentration in the exhaust gases when the engine is started by performing the fuel injection with the 2-cylinder simultaneous injection mode. FIG. 6A corresponds to a case where the correction of this embodiment is performed, and FIG. 6B corresponds to a case where the correction of this embodiment is not performed. When the correction is not performed, misfire due to shortage of the fuel amount occurs. Therefore, the engine rotational speed NE changes (Section A indicated in FIG. 6B), and the HC concentration in the exhaust gases increases (Section B indicated in FIG. 6B). On the other hand, when the correction is performed, misfire does not occur. Accordingly, the changes in the engine rotational speed NE and the increase in the HC concentration can be prevented.

In this embodiment, step S11 of FIG. 3 corresponds to the fuel injection amount parameter setting means, step S12 corresponds to the injection mode determining means, and steps S14 and S15 correspond to the correcting means. It is to be noted that the single mode injection period TOUTS corresponds to the "overlap period" in the 2-cylinder simultaneous injection mode. Further, the single injection mode corresponds to the reference injection mode.

Modification 1.1

In this modification, the correction coefficient KPFGR which is multiplied by the single mode injection period TOUTS is replaced with a correction amount TOUT- GRADD, and the correction is performed by adding the correction amount TOUTGRADD to the single mode injection period TOUTS.

Figure 4:
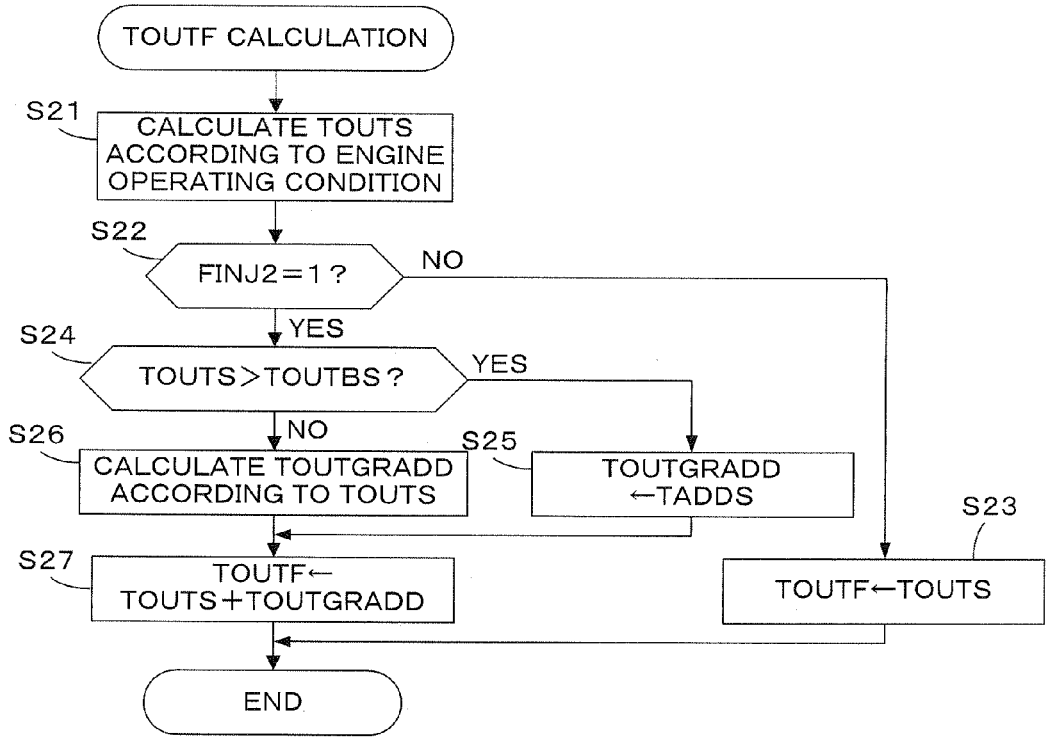
FIG. 4 is a flowchart of a modification of the process shown in FIG. 3.

FIG. 4 is a flowchart of a fuel injection period calculation process in this modification. Steps S21 to S23 of FIG. 4 are the same as steps S11 to S13 of FIG. 3.

Figure 5B:
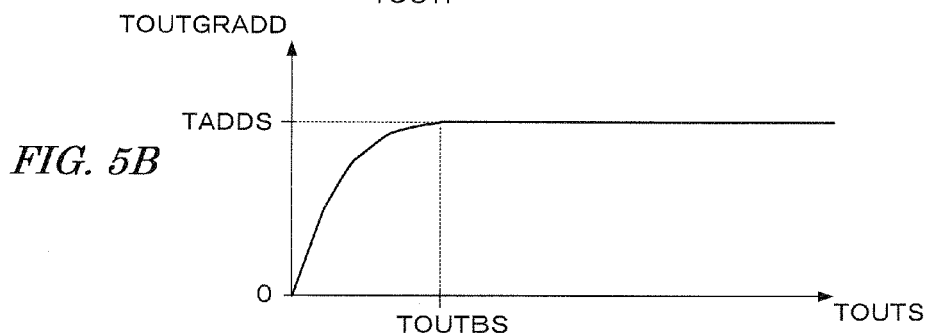

If the answer to step S22 is affirmative (YES), i.e., if the fuel injection mode is the 2-cylinder simultaneous injection mode, it is determined whether or not the single mode injection period TOUTS is greater than a boundary injection period TOUTBS (step S24). If the answer to step S24 is negative (NO), a TOUTGRADD table shown in FIG. 5B is retrieved according to the single mode injection period TOUTS, to calculate the correction amount TOUTGRADD (step S26). The TOUTGRADD table is set so that the correction amount TOUTGRADD increases as the single mode injection period TOUTS increases in a range where the single mode injection period TOUTS is equal to or less than the boundary injection period TOUTBS, and the correction amount TOUTGRADD is constant (set to a predetermined additional amount TADDS) in a range where the single mode injection period TOUTS is greater than the boundary injection period TOUTBS. It is to be noted that the boundary injection period TOUTBS corresponds to a period from the fuel injection start time to the boundary time tB shown in FIGS. 2A and 2B.

If the answer to step S24 is affirmative (YES), the correction amount TOUTGRADD is set to the predetermined additional amount TADDS (refer to FIG. 5B) (step S25).

In step S27, the fuel injection period TOUTF is calculated by the following equation (2).

$$TOUTF = TOUTS + TOUTGRADD \quad (2)$$

According to the process of FIG. 4, the correction can be performed similarly to the process of FIG. 3.

Further, in the process of FIG. 4, the range of the table shown in FIG. 5B where the single mode injection period TOUTS is greater than the boundary injection period TOUTBS is not actually used. Therefore, it is not necessary to set the data in this range on the table, which reduces load on the CPU and the memory capacity. Alternatively, steps S24 and S25 of FIG. 4 may be deleted. In such modification, if the answer to step S22 is affirmative (YES), the process immediately proceeds to step S26. In this case, the entire range of the table shown in FIG. 5B is referred to.

In this modification, step S21 of FIG. 4 corresponds to the fuel injection amount parameter setting means, step S22 corresponds to the injection mode determining means, and steps S24 to S27 correspond to the correcting means.

Modification 1.2

In the modification 1.1, an additional fuel injection may alternatively be performed after the main fuel injection corresponding to the single mode fuel injection period TOUTS. In such modification, the additional fuel injection corresponding to the correction amount TOUTGRADD is performed immediately after the main injection.

Modification 1.3

This modification is obtained by changing the reference injection mode in the above-described embodiment from the single injection mode to the 2-cylinder simultaneous injection mode. That is, the 2-cylinder simultaneous injection mode corresponds to the reference injection mode in this modification.

Figure 7:
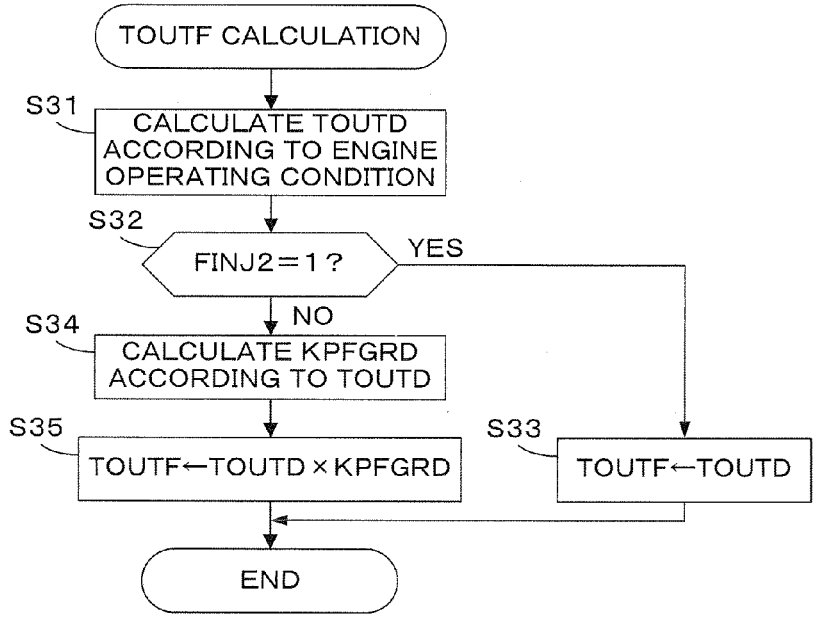
FIG. 7 is a flowchart of a modification of the process shown in FIG. 3.

FIG. 7 is a flowchart of a fuel injection period calculation process in this modification.

In step S31, a fuel injection period in the 2-cylinder simultaneous injection mode (hereinafter referred to as "overlap mode injection period") TOUTD is calculated according to the engine operating condition.

In step S32, it is determined whether or not the 2-cylinder simultaneous injection flag FINJ2 is equal to "1". If the answer to step S32 is affirmative (YES), i.e., if the fuel injection mode is the 2-cylinder simultaneous injection mode, the fuel injection period TOUTF is set to the overlap mode injection period TOUTD (step S33).

Figure 5C:
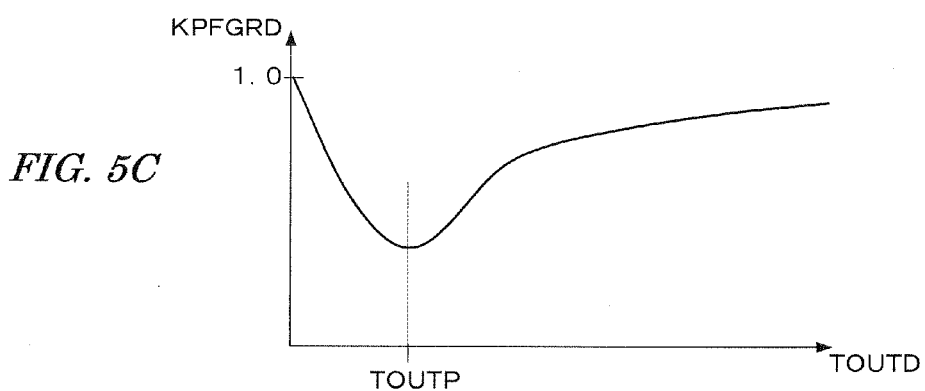

If the answer to step S32 is negative (NO), i.e., if the fuel injection mode is the single injection mode, a KPFGRD table shown in FIG. 5C is retrieved according to the overlap mode injection period TOUTD, to calculate a correction coefficient KPFGRD (step S34). The KPFGRD table corresponds to a table in which the set values are the reciprocal of the values set in the KPFGR table shown in FIG. 5A. The KPFGRD table is set so that the correction coefficient KPFGRD decreases as the overlap mode injection period TOUTD increases in a range where the overlap mode injection period TOUTD is equal to or less than the peak injection period TOUTP, and the correction coefficient KPFGRD increases as the overlap mode injection period TOUTD increases in a range where the overlap mode injection period TOUTD is greater than the peak injection period TOUTP.

In step S35, the fuel injection period TOUTF is calculated by the following equation (3).

$$TOUTF = TOUTD \times KPFGRD \quad (3)$$

In this modification, step S31 of FIG. 7 corresponds to the fuel injection amount parameter setting means, step S32 corresponds to the injection mode determining means, and steps S34 and S35 correspond to the correcting means. It is to be noted that the overlap mode injection period TOUTD corresponds to "the overlap period" in the single injection mode.

Modification 1.4

This modification is obtained by changing the reference injection mode in the modification 1.1 from the single injection mode to the 2-cylinder simultaneous injection mode. That is, the 2-cylinder simultaneous injection mode corresponds to the reference injection mode in this modification.

Figure 8:
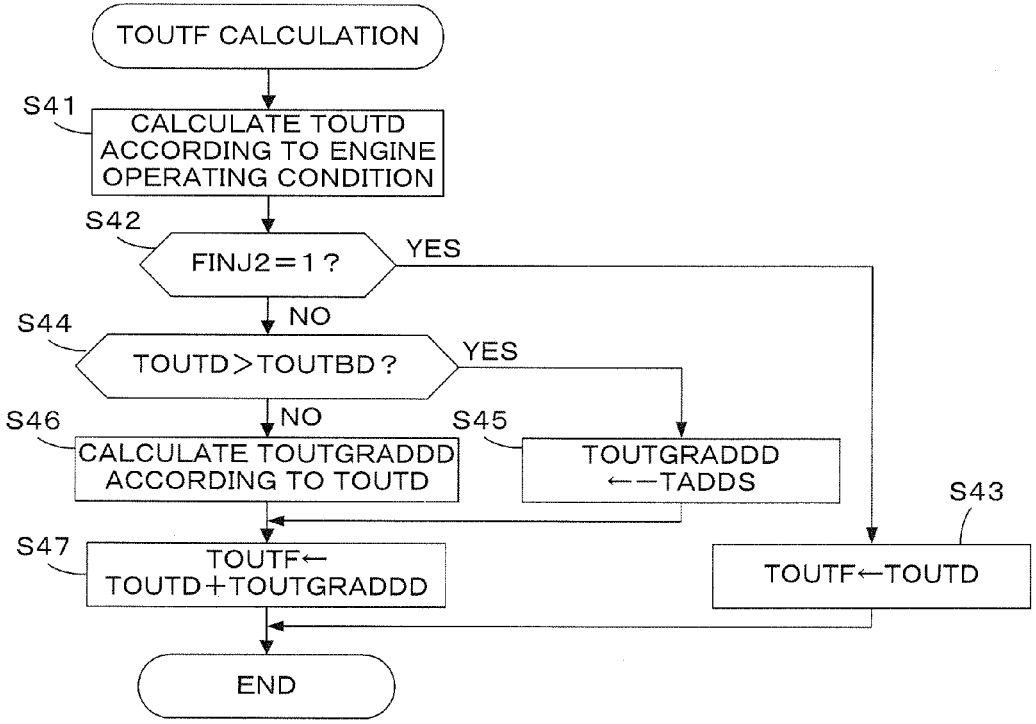
FIG. 8 is a flowchart of a modification of the process shown in FIG. 4.

FIG. 8 is a flowchart of a fuel injection period calculation process in this modification. Steps S41 to S43 of FIG. 8 are the same as steps S31 to S33 of FIG. 7.

Figure 5D:
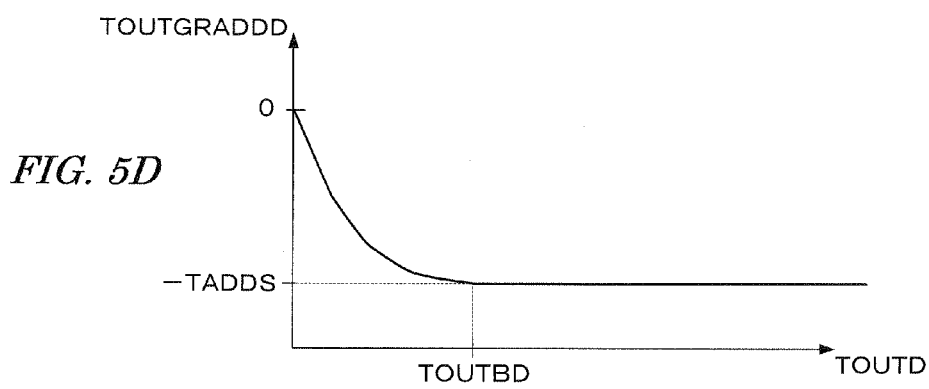

If the answer to step S42 is negative (NO), i.e., if the fuel injection mode is the single injection mode, it is determined whether or not the overlap mode injection period TOUTD is greater than the boundary injection period TOUTBD. If the answer to step S44 is negative (NO), a TOUTGRADDD table shown in FIG. 5D is retrieved according to the overlap mode injection period TOUTD, to calculate a correction amount TOUTGRADDD (<0). The TOUTGRADDD table is set so that the correction amount TOUTGRADDD decreases as the overlap mode injection period TOUTD increases in a range where the overlap mode injection period TOUTD is equal to or less than the boundary injection period TOUTBD, and the correction amount TOUTGRADDD is constant (set to "−TADDS") in a range where the overlap mode injection period TOUTD is greater than the boundary injection period TOUTBD.

If the answer to step S44 is affirmative (YES), the correction amount TOUTGRADDD is set to a predetermined additional amount "−TADDS" (step S45).

In step S47, the fuel injection period TOUTF is calculated by the following equation (4). According to the equation (4), the overlap mode injection period TOUTD is corrected in the decreasing direction.

$$TOUTF = TOUTD + TOUTGRADDD \quad (4)$$

According to the process of FIG. 8, the correction can be performed similarly to the process of FIG. 7.

In the process of FIG. 8, the range of the table shown in FIG. 5D where the overlap mode injection period TOUTD is greater than the boundary injection period TOUTBD is not actually used. Therefore, it is not necessary to set the data in this range on the table, which reduces load on the CPU and the memory capacity. Alternatively, steps S44 and S45 of FIG. 8 may be deleted. In such modification, if the answer to step S42 is affirmative (YES), the process immediately proceeds to step S46. In this case, the entire range of the table shown in FIG. 5D is referred to.

In this modification, step S41 of FIG. 8 corresponds to the fuel injection amount parameter setting means, step S42 corresponds to the injection mode determining means, and steps S44 to S47 correspond to the correcting means.

Modification 1.5

This modification is a modification of the modification 1.3. In this modification, the reference injection mode is a predetermined period overlapped injection mode in which the injection periods of two cylinders are overlapped for a predetermined period TOVF. In step S31 of FIG. 7, the overlap mode injection period TOUTD corresponding to the predetermined period overlapped injection mode is calculated. In step S32 of FIG. 7, it determined whether or not the present fuel injection mode is the predetermined period overlapped injection mode. If the answer to step S32 is affirmative (YES), the fuel injection period TOUTF is set to the overlap mode injection period TOUTD. On the other hand, if the present fuel injection mode is not the predetermined period overlapped injection mode, i.e., the overlap period of the two injection periods is equal to "0" or a period other than the predetermined period TOVF, a correction coefficient KPFGRD is calculated according to a difference period between the overlap period of the present fuel injection mode and the predetermined period TOVF, and the fuel injection period TOUTF is set to a product of the overlap mode injection period TOUTD and the correction coefficient KPFGRD.

Modification 1.6

This modification is a modification of the modification 1.4. In this modification, the reference injection mode is the predetermined period overlapped injection mode described above. In step S41 of FIG. 8, the overlap mode injection period TOUTD corresponding to the predetermined period overlapped injection mode is calculated. In step S42 of FIG. 8, it is determined whether or not the present fuel injection mode is the predetermined period overlapped injection mode. If the answer to step S42 is affirmative (YES), the fuel injection period TOUTF is set to the overlap mode injection period TOUTD. On the other hand, if the present fuel injection mode is not the predetermined period overlapped injection, i.e., the overlap period of the two injection periods is equal to "0" or a period other than the predetermined period TOVF, a correction amount TOUTGRADDD is calculated according to a difference period between the overlap period of the present fuel injection mode and the predetermined period TOVF, and the fuel injection period TOUTF is set to a sum of the overlap mode injection period TOUTD and the correction amount TOUTGRADDD.

Second Embodiment

In this embodiment, the fuel injection control is performed by selecting one of the single injection mode, the 2-cylinder simultaneous injection mode, the 3-cylinder simultaneous injection mode, and the 4-cylinder simultaneous injection mode. This embodiment is the same as the first embodiment except for the points described below.

Figure 9:
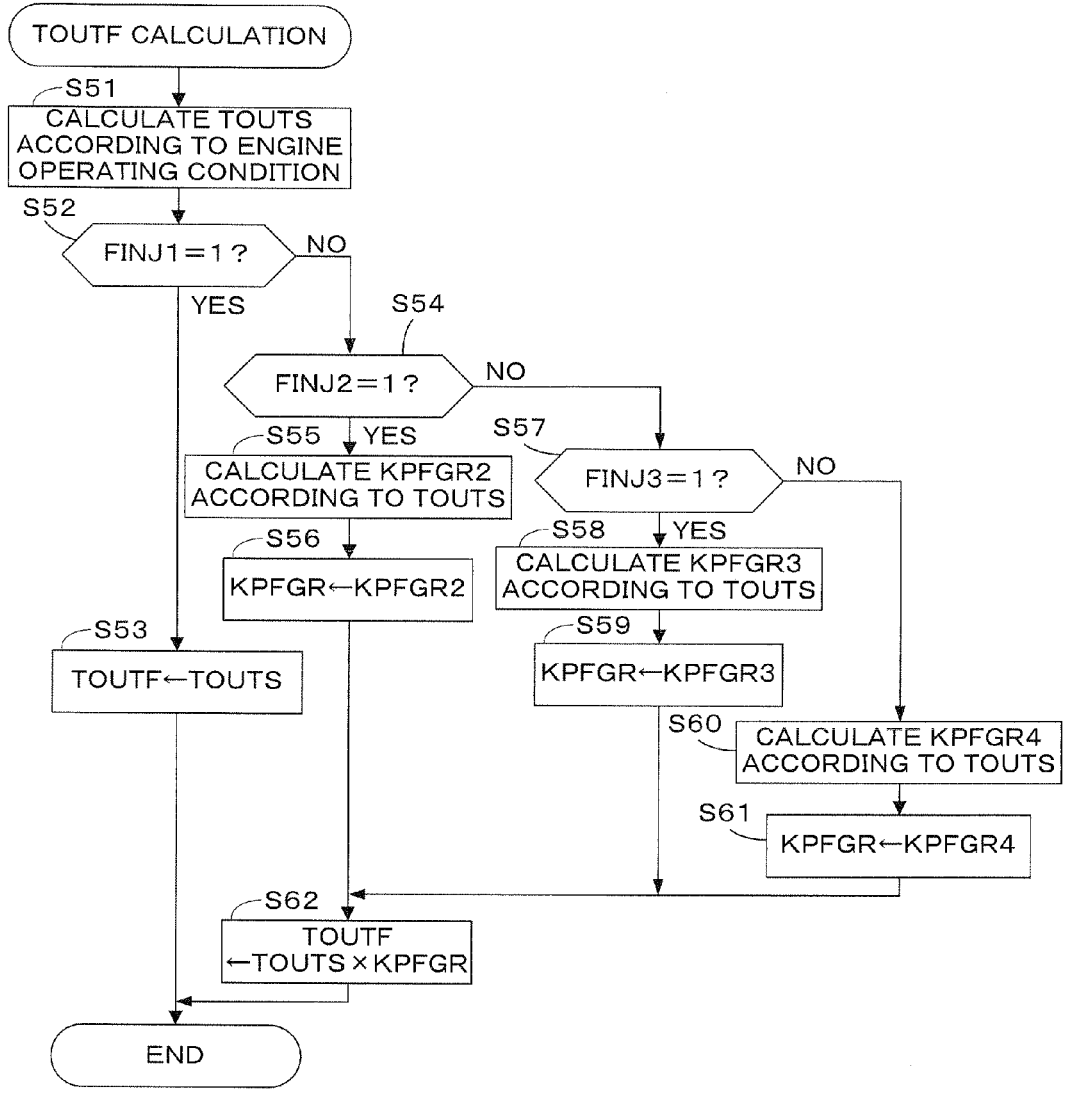
FIG. 9 is a flowchart of a process for calculating a fuel injection period (TOUTF) (second embodiment)

FIG. 9 is a flowchart of a process for calculating the fuel injection period TOUTF in this embodiment. This process is executed by the CPU in the ECU 5 in synchronism with generation of the TDC pulse.

In step S51, the single mode injection period TOUTS is calculated according to the engine operating condition. In step S52, it is determined whether or not a single injection flag FINJ1 is equal to "1". The single injection flag FINJ1 is set to "1" when the single injection mode in which the fuel injection periods do not overlap is selected. If the answer to step S52 is affirmative (YES), the fuel injection period TOUTF is set to the single mode injection period TOUTS (step S53).

If the answer to step S52 is negative (NO), it is determined whether or not the 2-cylinder simultaneous injection flag FINJ2 is equal to "1" (step S54). If the answer to step S54 is affirmative (YES), a 2-cylinder overlap correction coefficient KPFGR2 is calculated according to the single mode injection period TOUTS (step S55). The 2-cylinder overlap correction coefficient KPFGR2 corresponds to the correction coefficient KPFGR in the first embodiment, and is calculated by retrieving the table shown in FIG. 5A.

In step S56, the correction coefficient KPFGR is set to the 2-cylinder overlap correction coefficient KPFGR2. In step S62, the fuel injection period TOUTF is calculated by multiplying the correction coefficient KPFGR by the single mode injection period TOUTS.

If the answer to step S54 is negative (NO), it is determined whether or not a 3-cylinder simultaneous injection flag FINJ3 is equal to "1" (step S57). If the answer to step S57 is affirmative (YES), a KPFGR3 table (not shown) is retrieved according to the single mode injection period TOUTS, to calculate a 3-cylinder overlap correction coefficient KPFGR3 (step S58). The KPFGR3 table is set so that the correction coefficient KPFGR3 is greater than the corresponding value set on the KPFGR table shown in FIG. 5A. In step S59, the correction coefficient KPFGR is set to the 3-cylinder overlap correction coefficient KPFGR3. Thereafter, the process proceeds to step S62.

If the answer to step S57 is negative (NO), a KPFGR4 table (not shown) is retrieved according to the single mode injection period TOUTS, to calculated a 4-cylinder overlap correction coefficient KPFGR4 (step S60). The KPFGR4 table is set so that the correction coefficient KPFGR4 is greater than the corresponding value set on the KPFGR3 table. In step S61, the correction coefficient KPFGR is set to the 4-cylinder overlap correction coefficient KPFGR4. Thereafter, the process proceeds to step S62.

According to the process of FIG. 9, the amount of fuel supplied to each cylinder can be controlled to an appropriate value, when the fuel injections corresponding to 2, 3, or 4 cylinders are simultaneously performed.

In this embodiment, step S51 of FIG. 9 corresponds to the fuel injection amount parameter setting means, steps S52, S54, and S57 correspond to the injection mode determining means, and steps S55, S56, and S58-S62 correspond to the correcting means.

Third Embodiment

In this embodiment, the fuel injection period is corrected corresponding to the specific operating conditions where the fuel injection periods are overlapped as described below:

A) when the fuel injection of the next cylinder is started before completion of the present fuel injection in the operating condition where the engine rotational speed NE rapidly increases so that the time period of one stroke becomes shorter due to the initial combustion upon starting the engine, or due to a rapid acceleration;

B) when an additional fuel injection is performed with respect to the cylinder in the intake stroke while performing the normal fuel injection in the exhaust stroke in the operating condition where a rapid increase in the output torque is required, such as the operating condition where the engine speed is rapidly accelerated or the fuel cut operation ends to restart the fuel injection; and C) when the fuel injection to the next cylinder is started before completion of the present fuel injection in the operating condition where the fuel injection period is set to a comparatively great value, such as when performing the cold start of the engine.

Figure 10:
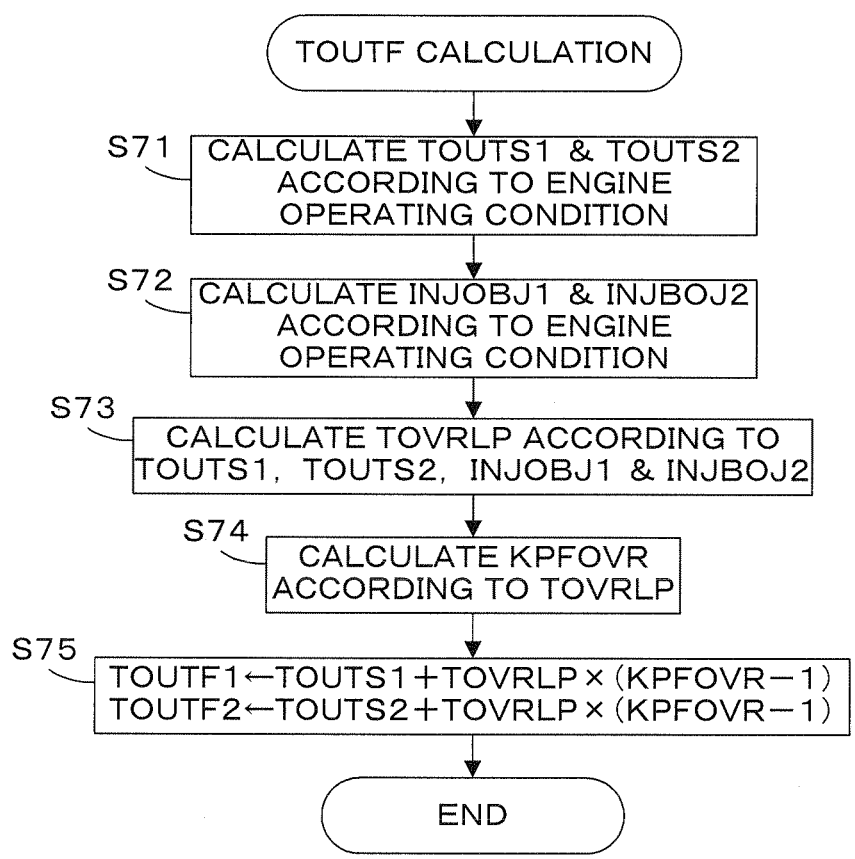
FIG. 10 is a flowchart of a process for calculating a fuel injection period (TOUTF) (third embodiment)

FIG. 10 is a flowchart of a process for calculating the fuel injection period TOUTF in this embodiment.

In step S71, first and second single mode injection periods TOUTS1 and TOUTS2 are calculated according to the engine operating condition. The first and second single mode injection periods TOUTS1 and TOUTS2 are single mode injection periods respectively corresponding to a present fuel injection cylinder and a next fuel injection cylinder. In step S72, first and second fuel injection timings INJOBJ1 and INJOBJ2 are calculated according to the engine operating condition. The first and second fuel injection timings INJOBJ1 and INJOBJ2 are start timings (indicated with the crank angle) of the fuel injections respectively corresponding to the present fuel injection cylinder and the next fuel injection cylinder.

In step S73, an overlap period TOVRLP is calculated according to the first and second single mode injection periods TOUTS1 and TOUTS2, and the first and second fuel injection timings INJOBJ1 and INJOBJ2.

Figure 11A:
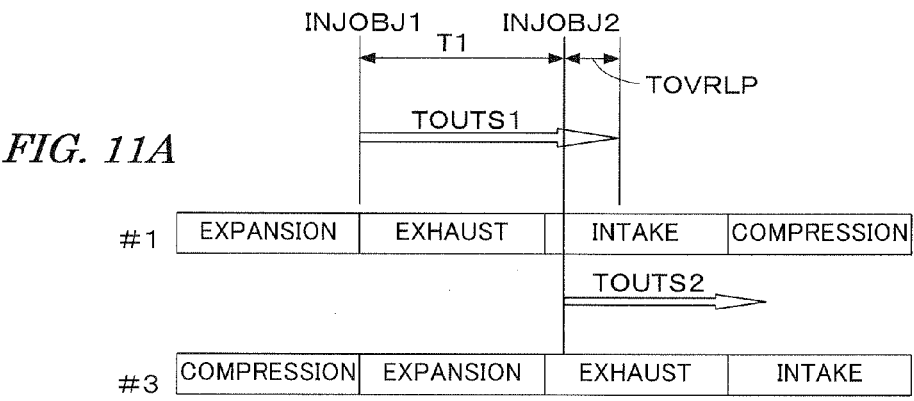
FIGS. 11A-11C are diagrams for illustrating a calculation method of a overlap period (TOVRLP) of the fuel injection periods.
Figure 11B:
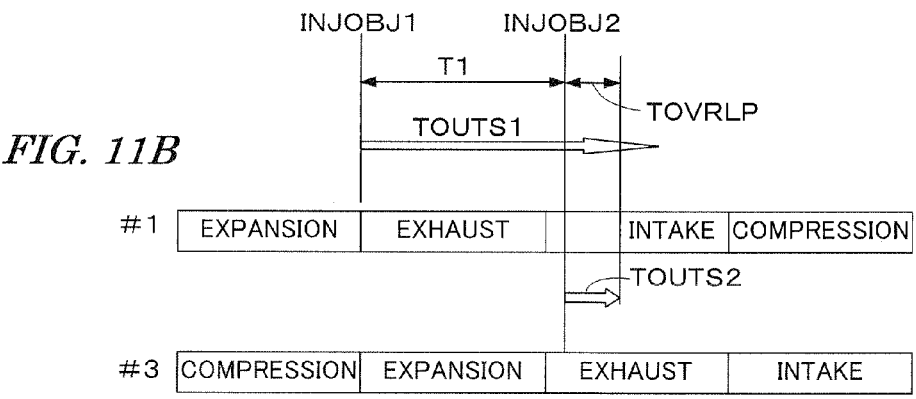
Figure 11C:
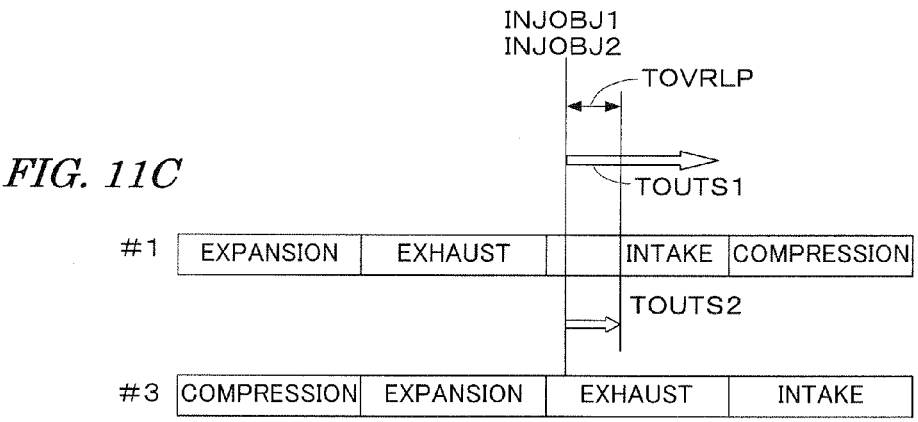

FIGS. 11A-11C are diagrams for illustrating a calculation method of the overlap period TOVRLP. FIGS. 11A-11C corresponds to an example where the present fuel injection cylinder is #1 cylinder and the next fuel injection cylinder is #3 cylinder.

An angular difference between the first fuel injection timing INJOBJ1 and the second fuel injection timing INJOBJ2 is converted into a time lag T1 according to the engine rotational speed NE, and a overlap period TOVRLP is calculated by the following equation (5). The expression of "min{X1,X2}" corresponds to a calculation of selecting the smaller one of X1 and X2.

$$TOVRLP=\min\{(TOUTS1-T1),TOUTS2\} \quad (5)$$

In the example shown in FIG. 11A, the overlap period TOVRLP is given by (TOUTS1−T1). In the example shown in FIG. 11B, the overlap period TOVRLP is given by TOUTS2. In the example shown in FIG. 11C, the time lag T1 is equal to "0", and the overlap period TOVRLP is given by TOUTS1.

Returning back to FIG. 10, in step S74, a correction coefficient KPFOVR is calculated according to the overlap period TOVRLP. The KPFGR table shown in FIG. 5A is used for this calculation.

In step S75, the first and second fuel injection periods TOUTF1 and TOUTF2 are respectively calculated by the following equations (6) and (7). The first and second fuel injection periods TOUTF1 and TOUTF2 are fuel injection periods respectively corresponding to the present fuel injection cylinder and the following fuel injection cylinder.

$$TOUTF1=TOUTS1+TOVRLP\times(KPFOVR-1) \quad (6)$$

$$TOUTF2=TOUTS2+TOVRLP\times(KPFOVR-1) \quad (7)$$

According to the process of FIG. 10, the amount of fuel supplied to each cylinder can be controlled to an appropriate value in the specific operating conditions as the above-described conditions A to C.

In this embodiment, step S71 of FIG. 10 corresponds to the fuel injection amount parameter setting means, step S73 corresponds to the injection mode determining means, and steps S74 and S75 correspond to the correcting means.

Fourth Embodiment

In this embodiment, an average value (average fuel pressure) of the fuel pressure during the fuel injection is calculated after completion of the fuel injection (main injection), and an additional fuel injection period is calculated according to the calculated average fuel pressure and a reference average fuel pressure corresponding to the single mode injection. Further, an additional fuel injection of the calculated additional fuel injection period is performed after execution of the main injection.

Figure 12:
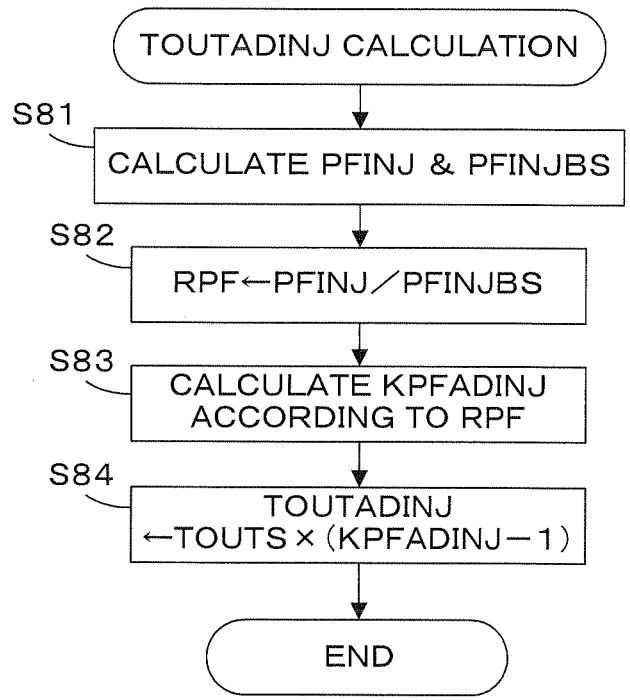
FIG. 12 is a flowchart of a process for calculating a fuel injection period (TOUTADINJ) of the fuel injection performed in addition to the normal fuel injection (fourth embodiment)

FIG. 12 is a flowchart of a process for calculating an additional fuel injection period TOUTADINJ. This process is executed immediately after completion of the normal fuel injection (main injection). It is to be noted that the fuel injection period TOUTS of the main injection is calculated similarly to the other embodiments.

In step S81, an average fuel pressure PFINJ during the injection period TOUTS of the completed main injection and a reference fuel pressure PFINJBS are calculated. The reference fuel pressure PFINJBS is an average fuel pressure during the injection period TOUTS when performing the single injection. The average fuel pressure PFINJ is obtained, for example, by detecting a fuel pressure PF with a fuel pressure sensor disposed in the delivery pipe 21 and averaging the detected fuel pressure PF. The reference fuel pressure PFINJBS can be calculated by retrieving a table according to the injection period TOUTS, since the reference fuel pressure PFINJBS can be preliminarily calculated according to the injection period TOUTS (refer to FIG. 14B described below).

In step S82, a fuel pressure ratio RPF is calculated by the following equation (8).

$$RPF=PFINJ/PFINJBS \quad (8)$$

Figure 13:
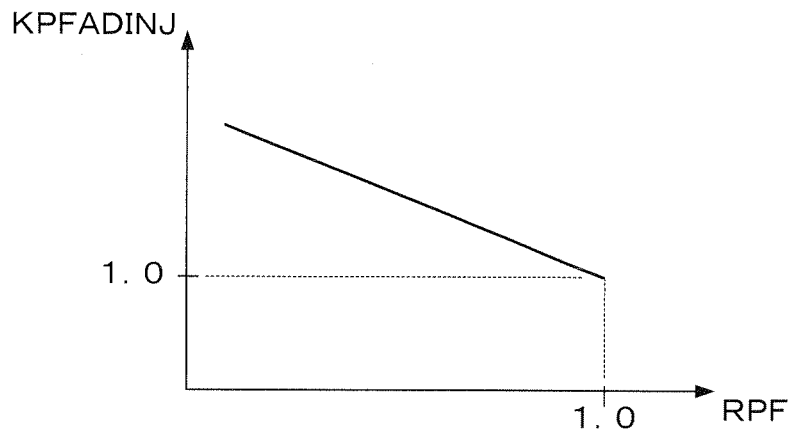
FIG. 13 show a table referred to in the process of FIG. 12.

In step S83, a KPFADINJ table shown in FIG. 13 is retrieved according to the fuel pressure ratio RPF, to calculate an additional injection correction coefficient KPFADINJ. When the fuel pressure ratio RPF is equal to "1.0", which indicates that the fuel injection of other cylinders which overlaps with the execution period of the main injection (main injection period) was not performed, the additional injection correction coefficient KPFADINJ is set to "1.0". The KPFADINJ table is set so that the additional injection correction coefficient KPFADINJ increases as the fuel pressure ratio RPF decreases (the average fuel pressure PFINJ decreases).

In step S84, the additional fuel injection period TOUTAD-INJ is calculated by the following equation (9).

$$TOUTADINJ=TOUTS\times(KPFADINJ-1) \quad (9)$$

According to the equation (9), the additional fuel injection period TOUTADINJ takes a value of "0" when the additional injection correction coefficient KPFADINJ is equal to "1.0". Therefore, the additional fuel injection is not performed. When the fuel injection whose injection period overlaps with the execution period of the main injection is performed, the additional injection correction coefficient KPFADINJ takes a value greater than "1.0". Therefore, the additional fuel injection period TOUTADINJ is calculated so as to increase as the overlapped fuel injection period becomes longer.

When the additional fuel injection period TOUTADINJ is greater than "0", the additional fuel injection is immediately performed with respect to the cylinder to which the main injection is performed.

According to the process of FIG. 12, the amount of fuel supplied to the cylinder can be corrected to an appropriate value without predicting the overlap of the fuel injection periods.

In this embodiment, step S81 of FIG. 12 corresponds to the average fuel pressure calculating means, and steps S82 to S84 correspond to the additional correction amount calculating means.

Modification 4.1

The calculation method of the additional fuel injection period TOUTADINJ according to the fuel pressure ratio RPF as described above, may be applied to the calculation of the correction amount TOUTGRADD in the modification 1.2 of the first embodiment. That is, immediately after completion of the main fuel injection corresponding to the single mode fuel injection period TOUTS, the additional fuel injection period TOUTADINJ (=TOUTGRADD) may be calculated according to the fuel pressure ratio RPF and the additional fuel injection corresponding to the additional fuel injection period TOUTADINJ may be performed.

Modification 4.2

In the process of FIG. 12 described above, the average fuel pressure PFINJ is calculated using the detected fuel pressure PF. Alternatively, an estimated average fuel pressure PFINJE obtained by the estimating calculation may be used. The estimated average fuel pressure PFINJE is calculated, for example, as described below. A flow rate (return flow rate) of fuel returned from the pressure regulator to the fuel tank is calculated based on a demand injection flow rate upon execution of the fuel injection and a discharge amount of the fuel pump, and the estimated average fuel pressure PFINJE is calculated according to the return flow rate.

Supplemental Description Regarding Correction

Figure 14A:
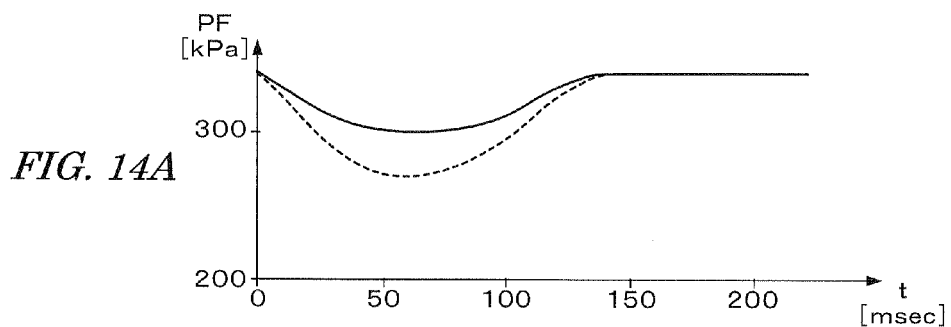
FIGS. 14A-14C, 15A and 15B are time charts for illustrating a correction method of the fuel injection period.
Figure 14B:
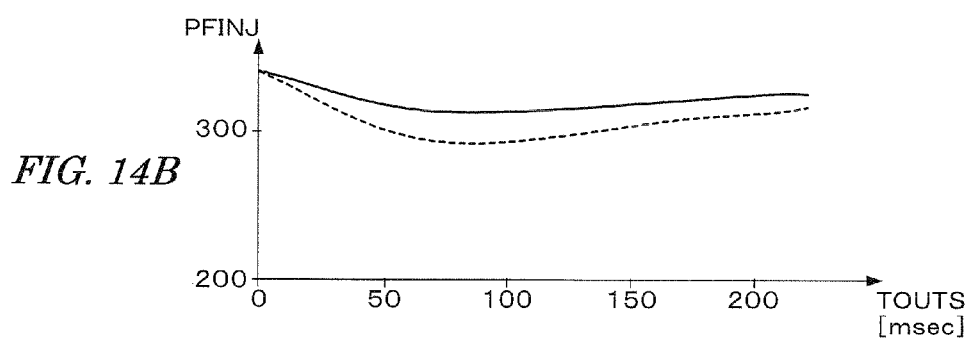
Figure 14C:
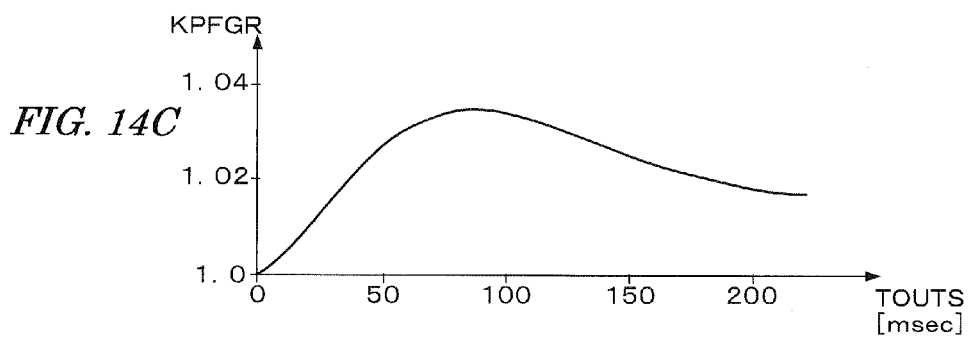

FIGS. 14A-14C are time charts for illustrating a relationship between the fuel pressure PF and the correction coefficient KPFGR. FIG. 14A shows changes in the fuel pressure PF when performing the fuel injection. In FIG. 14A, the solid line corresponds to the single injection mode, and the broken line corresponds to the 2-cylinder simultaneous injection mode.

FIG. 14B shows the average fuel pressure PFINJ during the fuel injection period TOUTS in the example where the fuel pressure PF changes as shown in FIG. 14A. In FIG. 14B, the solid line corresponds to the single injection mode and the broken line corresponds to the 2-cylinder simultaneous injection mode. In the fourth embodiment described above, the reference fuel pressure PFINJBS can be calculated with the characteristic of the solid line shown in FIG. 14B.

FIG. 14C corresponds to the KPFGR table shown in FIG. 5A. The curve of the correction coefficient KPFGR shown in FIG. 14C is calculated by applying the reference fuel pressure PFINJBS and an average fuel pressure PFINJ2 in the 2-cylinder simultaneous injection mode to the following equation (10). It is confirmed with Bernoulli's equation that the amount (mass) of injected fuel is proportional to a square root of the average fuel pressure. Accordingly, the correction coefficient KPFGR can be calculated by the equation (10).

$$KPFGR = \frac{1}{\sqrt{\frac{PFINJ2}{PFINJBS}}} \quad (10)$$

Therefore, in the above-described embodiments, the correction coefficient KPFGR and the like are calculated by retrieving the table according to the fuel injection period. Alternatively, the correction coefficient KPFGR may be calculated by applying the average fuel pressure to the equation (10). As described above, the method in which the average fuel pressure PFINJ is calculated from the detected fuel pressure PF or the method in which the average fuel pressure PFINJ is calculated by the estimating calculation, can be applied to the calculation of the average fuel pressure PFINJ. It is to be noted that the curve shown by the broken line in FIG. 14B is obtained when the fuel pressure change characteristic is previously known like in the 2-cylinder simultaneous injection mode, the 3-cylinder simultaneous injection mode, or the like. Therefore, the average fuel pressure PFINJ can be calculated by retrieving the table according to the fuel injection period.

Figure 15A:
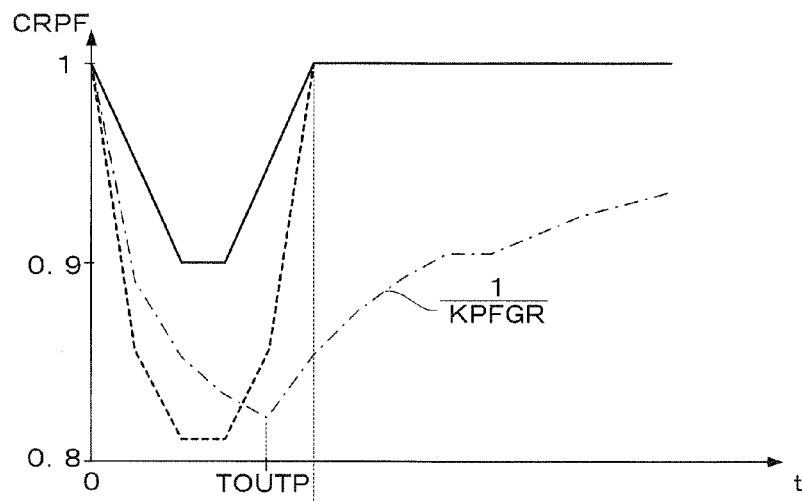
Figure 15B:
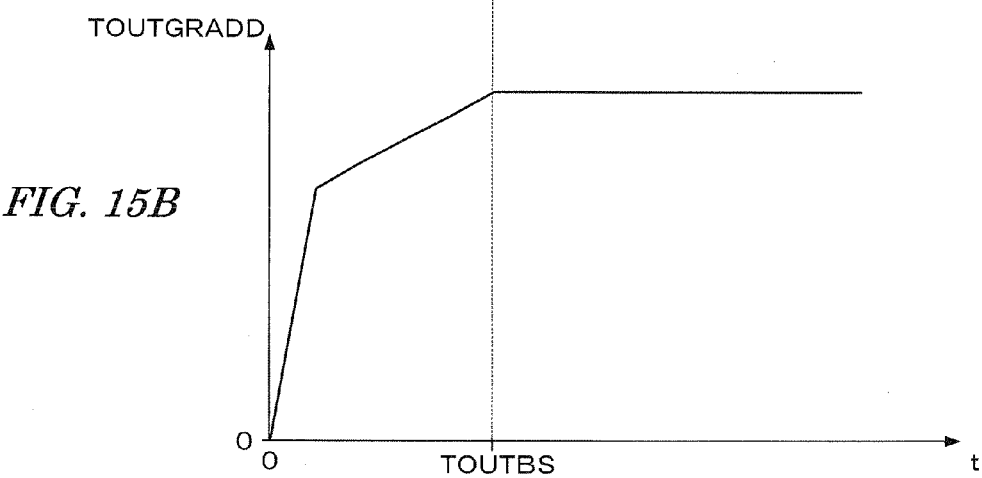

FIGS. 15A and 15B are time charts for illustrating the peak injection period TOUTP of the KPFGR table and the boundary injection period TOUTBS of the TOUTGRADD table shown in FIGS. 5A and 5B. FIG. 15A is a time chart schematically showing the fuel pressure changes during the fuel injection period using a change rate CRPF which is defined by setting the fuel pressure at the beginning of the injection to "1". In FIG. 15A, the solid line corresponds to the single injection mode and the broken line corresponds to the 2-cylinder simultaneous injection mode. Further, the dot-and-dash line shows changes in the reciprocal of the correction coefficient KPFGR (square root of PFINJ2/PFINJBS). In FIG. 15A, the reciprocal (1/KPFGR) takes a minimum value at the peak injection period TOUTP. The peak injection period TOUTP changes depending on the discharging capacity of the fuel pump, the transfer delay due to the configuration of the passage from the fuel pump to the fuel injection valve, the configuration of the pulsation damper, the injection performance of the fuel injection valve, and the like.

FIG. 15B shows a setting of the correction amount TOUTGRADD corresponding to the characteristic shown in FIG. 15A. In the range (t≤TOUTBS) where the fuel pressure indicated by the solid line differs from the fuel pressure indicated by the broken line, the correction amount TOUTGRADD increases as the time lapses. In the range (t>TOUTBS) where the fuel pressure of the solid line is equal to the fuel pressure of the broken line, the correction amount TOUTGRADD is constant. The boundary injection period TOUTBS changes, like the peak injection period TOUTP, depending on the discharge capacity of the fuel pump, the transfer delay due to the configuration of the passage from the fuel pump to the fuel injection valve, the configuration of the pulsation damper, the injection performance of the fuel injection valve, and the like. Therefore, when using a fuel pump of variable discharging capacity, it is preferable to use a plurality of KPFGR tables or TOUTGRADD tables which are set according to the discharging capacity of the fuel pump. It is to be noted that the boundary injection period TOUTBS is greater than the peak injection period TOUTP as apparent from FIGS. 15A and 15B.

Further, not only the boundary injection period TOUTBS and the peak injection period TOUTP described above but the preferable setting of each table shown in FIGS. 5A-5D changes depending on the operating characteristics of the controlled object engine and the fuel supply system of the engine. Therefore, the settings of tables are not limited to the settings shown in FIGS. 5A-5D. It is preferable to set the tables in use to desired characteristics according to the operating characteristics of the engine and the fuel supply system.

In the above-described embodiments, the present invention is applied to the fuel supply apparatus of the internal combustion engine in which fuel is injected into the intake pipe (intake port). The present invention is applicable also to a fuel supply apparatus of a direct injection internal combustion engine in which fuel is directly injected into the combustion chamber. Further, in the above-described embodiments, the fuel supply apparatus for a four-cylinder internal combustion engine is shown. The present invention is applicable to a fuel supply apparatus for an internal combustion engine having more than one cylinder.

Further, an injection volume flow rate of fuel or an injection mass of fuel may be used as the "fuel injection amount parameter".

The present invention can be applied also to a fuel supply apparatuses for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A fuel supply apparatus for an internal combustion engine having a plurality of cylinders, which supplies fuel through fuel injection valves provided corresponding to the plurality of cylinders, said fuel supply apparatus comprising:
fuel injection control means for controlling an amount of fuel supplied to said engine by changing a fuel injection period of said fuel injection valve, and performing a fuel injection with a plurality of injection modes including a reference injection mode,
wherein said fuel injection control means includes:
fuel injection amount parameter setting means for setting a fuel injection amount parameter for controlling a valve opening period of said fuel injection valve in the reference injection mode, according to an operating condition of said engine;
injection mode determining means for determining whether or not an injection mode of the fuel injection to be performed is the reference injection mode; and
correcting means for correcting the fuel injection amount parameter so as to compensate shortage or oversupply of the fuel injection amount according to a correction parameter when the injection mode is determined to be another injection mode which differs from the reference injection mode, the correction parameter indicating a time period which affects a pressure change of the fuel supplied to said fuel injection valve caused by employing the other injection mode.

2. A fuel supply apparatus according to claim 1, wherein the reference injection mode is a single injection mode in which the fuel injection periods of said fuel injection valves corresponding to the plurality of cylinders do not overlap with each other, and the other injection mode is an overlapped injection mode in which the fuel injection periods corresponding to a part or all of the plurality of cylinders overlap with each other,
wherein the correction parameter is an overlap period of the fuel injection periods corresponding to the plurality of cylinders.

3. A fuel supply apparatus according to claim 2, wherein said correcting means calculates a correction coefficient according to the overlap period, and corrects the fuel injection amount parameter using the correction coefficient,
wherein the correction coefficient is set so that the correction coefficient increases as the overlap period increases in a range where the overlap period is equal to or less than a first threshold value, and the correction coefficient decreases as the overlap period increases in a range where the overlap period is greater than the first threshold value.

4. A fuel supply apparatus according to claim 2, wherein said correcting means calculates a correction amount according to the overlap period, and performs the correction by adding the correction amount to the fuel injection amount parameter,
wherein the correction amount is set so that the correction coefficient increases as the overlap period in a range where the overlap period is equal to or less than a second threshold value, and the correction coefficient is constant in a range where the overlap period is greater than the second threshold value.

5. A fuel supply apparatus according to claim 1, wherein the reference injection mode is a predetermined period overlapped injection mode in which fuel injection periods of said fuel injection valves corresponding to a part or all of the plurality of cylinders overlap with each other for a predetermined period, and the other injection mode is a fuel injection mode in which an overlap period of the fuel injection periods corresponding to the plurality of cylinders is equal to "0" or a period other than the predetermined period,
wherein the correction parameter is a difference period between the predetermined period in the reference injection mode and the overlap period in the other injection mode.

6. A fuel supply apparatus according to claim 1, wherein the reference injection mode is an overlapped injection mode in which fuel injection periods of said fuel injection valves corresponding to a part or all of the plurality of cylinders overlap with each other, and the other injection mode is a single injection mode in which the fuel injection periods corresponding to the plurality of cylinders do not overlap,
wherein the correction parameter is an overlap period of the fuel injection periods corresponding to the plurality of cylinders.

7. A fuel supply apparatus according to claim 6, wherein said correcting means calculates a correction coefficient according to the overlap period, and corrects the fuel injection amount parameter using the correction coefficient,
wherein the correction coefficient is set so that the correction coefficient decreases as the overlap period increases in a range where the overlap period is equal to or less than a first threshold value, and the correction coefficient increases as the overlap period increases in a range where the overlap period is greater than the first threshold value.

8. A fuel supply apparatus according to claim 6, wherein said correcting means calculates a correction amount according to the overlap period, and performs the correction by adding the correction amount to the fuel injection amount parameter,
wherein the correction amount is set so that the correction amount decreases as the overlap period increases in a range where the overlap period is equal to or less than a second threshold value, and the correction amount is constant in a range where the overlap period is greater than the second threshold value.

9. A fuel supply apparatus for an internal combustion engine having a plurality of cylinders, which supplies fuel through fuel injection valves provided corresponding to the plurality of cylinders, said fuel supply apparatus comprising:
fuel injection control means for controlling an amount of fuel supplied to said engine by changing a fuel injection period of said fuel injection valve, and performing a fuel injection with a plurality of injection modes including a reference injection mode; and
fuel pressure parameter calculating means for calculating a fuel pressure parameter indicative of a pressure of the fuel supplied to said fuel injection valve,
wherein said fuel injection control means includes:
fuel injection amount parameter setting means for setting a fuel injection amount parameter for controlling a valve opening period of said fuel injection valve in the reference injection mode according to an operating condition of said engine;
injection mode determining means for determining whether or not an injection mode of the fuel injection to be performed is the reference injection mode; and
correcting means for correcting the fuel injection amount parameter according to a ratio of the fuel pressure parameter value corresponding to another injection mode which differs from the reference injection mode, and the fuel pressure parameter value corresponding to the reference injection mode, when the injection mode is determined to be the other injection mode.

10. A fuel supply apparatus according to claim 1, wherein the reference injection mode is a single injection mode in which fuel injection periods of said fuel injection valves corresponding to the plurality of cylinders do not overlap, and the other injection mode is an overlapped injection mode in which the fuel injection periods corresponding to a part or all of the plurality of cylinders overlap with each other,
wherein said correcting means performs the correction by performing an additional fuel injection in the other injection mode.

11. A fuel supply apparatus according to claim 9, wherein the reference injection mode is a single injection mode in which fuel injection periods of said fuel injection valves corresponding to the plurality of cylinders do not overlap, and the other injection mode is an overlapped injection mode in which the fuel injection periods corresponding to a part or all of the plurality of cylinders overlap with each other,
wherein said correcting means performs the correction by performing an additional fuel injection in the other injection mode.

12. A fuel supply apparatus according to claim 9, wherein the fuel pressure parameter is an average value of the fuel pressure during the valve opening period of said fuel injection valve.

13. A fuel supply apparatus for an internal combustion engine having a plurality of cylinders, which supplies fuel through fuel injection valves provided corresponding to the plurality of cylinders, said fuel supply apparatus comprising:
fuel injection control means for controlling an amount of fuel supplied to said engine by changing a fuel injection period of said fuel injection valve, and performing a fuel injection with a plurality of injection modes including a reference injection mode,
wherein the reference injection mode is a single injection mode in which fuel injection periods of said fuel injection valves corresponding to the plurality of cylinders do not overlap, and another injection mode is an overlapped injection mode in which the fuel injection periods corresponding to a part or all of the plurality of cylinders overlap with each other,
wherein said fuel injection control means includes:
fuel injection amount parameter setting means for setting a fuel injection amount parameter for controlling a valve opening period of said fuel injection valve in the reference injection mode according to an operating condition of said engine;
average fuel pressure calculating means for calculating an average fuel pressure which is an average value of a pressure of fuel supplied to said fuel injection valve during a main fuel injection, said average fuel pressure calculating means performing the calculation immediately after completion of the main fuel injection performed according to the fuel injection amount parameter; and
additional correction amount calculating means for calculating an additional correction amount according to a ratio of the average fuel pressure calculated by said average fuel pressure calculating means and a reference average fuel pressure corresponding to the reference injection mode,
wherein an additional fuel injection for injecting fuel of the additional correction amount is performed immediately after execution of the main fuel injection.

14. A fuel supply method for an internal combustion engine having a plurality of cylinders, for supplying fuel through fuel injection valves provided corresponding to the plurality of cylinders,
wherein an amount of fuel supplied to said engine is controlled by changing a fuel injection period of said fuel injection valve, and a fuel injection is performed with a plurality of injection modes including a reference injection mode,
said fuel supply method comprising the steps of:
a) setting a fuel injection amount parameter for controlling a valve opening period of said fuel injection valve in the reference injection mode, according to an operating condition of said engine;
b) determining whether or not an injection mode of the fuel injection to be performed is the reference injection mode; and
c) correcting the fuel injection amount parameter so as to compensate shortage or oversupply of the fuel injection amount according to a correction parameter when the injection mode is determined to be another injection mode which differs from the reference injection mode, the correction parameter indicating a time period which affects a pressure change of the fuel supplied to said fuel injection valve caused by employing the other injection mode.

15. A fuel supply method for an internal combustion engine having a plurality of cylinders, for supplying fuel through fuel injection valves provided corresponding to the plurality of cylinders,
wherein an amount of fuel supplied to said engine is controlled by changing a fuel injection period of said fuel injection valve, and a fuel injection is performed with a plurality of injection modes including a reference injection mode,
said fuel supply method comprising the steps of:
a) setting a fuel injection amount parameter for controlling a valve opening period of said fuel injection valve in the reference injection mode according to an operating condition of said engine;

b) determining whether or not an injection mode of the fuel injection to be performed is the reference injection mode;

c) calculating a fuel pressure parameter indicative of a pressure of the fuel supplied to said fuel injection valve; and d) correcting the fuel injection amount parameter according to a ratio of the fuel pressure parameter value corresponding to another injection mode which differs from the reference injection mode, and the fuel pressure parameter value corresponding to the reference injection mode, when the injection mode is determined to be the other injection mode.

16. A fuel supply method for an internal combustion engine having a plurality of cylinders, for supplying fuel through fuel injection valves provided corresponding to the plurality of cylinders, wherein an amount of fuel supplied to said engine is controlled by changing a fuel injection period of said fuel injection valve, and a fuel injection is performed with a plurality of injection modes including a reference injection mode, wherein the reference injection mode is a single injection mode in which fuel injection periods of said fuel injection valves corresponding to the plurality of cylinders do not overlap, and another injection mode is an overlapped injection mode in which the fuel injection periods corresponding to a part or all of the plurality of cylinders overlap with each other, said fuel supply method comprising the steps of:

a) setting a fuel injection amount parameter for controlling a valve opening period of said fuel injection valve in the reference injection mode according to an operating condition of said engine;

b) calculating an average fuel pressure which is an average value of a pressure of fuel supplied to said fuel injection valve during a main fuel injection, the calculation being performed immediately after completion of the main fuel injection performed according to the fuel injection amount parameter;

c) calculating an additional correction amount according to a ratio of the average fuel pressure calculated in said step b) and a reference average fuel pressure corresponding to the reference injection mode; and d) performing an additional fuel injection for injecting fuel of the additional correction amount immediately after execution of the main fuel injection.

* * * * *